US011040283B2

(12) United States Patent
Yamagami et al.

(10) Patent No.: US 11,040,283 B2
(45) Date of Patent: Jun. 22, 2021

(54) COMPUTER-READABLE NON-TRANSITORY STORAGE MEDIUM HAVING GAME PROGRAM STORED THEREIN, GAME PROCESS CONTROL METHOD, AND GAME APPARATUS

(71) Applicant: NINTENDO CO., LTD., Kyoto (JP)

(72) Inventors: Hitoshi Yamagami, Kyoto (JP); Kaori Ando, Kyoto (JP); Takayasu Morisawa, Kyoto (JP); Yuki Sakamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 391 days.

(21) Appl. No.: 15/851,861

(22) Filed: Dec. 22, 2017

(65) Prior Publication Data

US 2018/0296919 A1 Oct. 18, 2018

(30) Foreign Application Priority Data

Apr. 13, 2017 (JP) .............................. JP2017-079563

(51) Int. Cl.
*A63F 13/537* (2014.01)
*A63F 13/95* (2014.01)
(Continued)

(52) U.S. Cl.
CPC ........ *A63F 13/537* (2014.09); *A63F 13/2145* (2014.09); *A63F 13/426* (2014.09);
(Continued)

(58) Field of Classification Search
CPC .. A63F 13/537; A63F 13/5372; A63F 13/426; A63F 13/80; A63F 13/2145;
(Continued)

(56) References Cited

U.S. PATENT DOCUMENTS

2006/0073863 A1* 4/2006 Hagiwara ........... A63F 13/2145
463/9
2014/0235338 A1* 8/2014 Hansson ............. A63F 13/2145
463/31
(Continued)

FOREIGN PATENT DOCUMENTS

JP 2016-182245 10/2016
JP 2017-055994 3/2017

OTHER PUBLICATIONS

Line Corporation, Disney Tsum Tsum [online], retrieved Oct. 30, 2017, 3 pages, https://play.google.com/store/apps/details?id=com.linecorp_LGTMTMG&hl=en.
LINE GAME Releases New Sliding Puzzle Game "Line Toys" Starring Brown, Cony, Sally, and other Hit LINE Friends, LINE-[online], Aug. 12, 2015, URL, https://linecorp.com/ja/pr/news/ja/2015/1061, LINE[online], Aug. 12, 2015, URL, https://linecorp.com/en/pr/news/en/2015/1062, (7 pages).
Playing "Wind Puzzle Colorful", YouTube [online] [video]URL, https://www.youtube.com/watch?v=Oh5LxTxH3KM published on Jan. 21, 2015.
(Continued)

*Primary Examiner* — Kang Hu
*Assistant Examiner* — Thomas H Henry
(74) *Attorney, Agent, or Firm* — Nixon & Vanderhye, P.C.

(57) ABSTRACT

On a plurality of paths within a virtual space, objects moving in movement directions that are determined for the paths, respectively, are displayed. When an operation input has been performed by a player, whether a plurality of the objects that satisfy a predetermined condition have been designated is determined. When it is determined that the plurality of the objects that satisfy the predetermined condition have been designated, the plurality of the designated objects are caused to enter a state of being selected. At predetermined timing, control in which a display manner of selected objects that are the objects in the state of being selected is changed or the selected objects are eliminated from the path is performed.

12 Claims, 24 Drawing Sheets

(51) Int. Cl.
*A63F 13/46* (2014.01)
*A63F 13/5372* (2014.01)
*A63F 13/426* (2014.01)
*A63F 13/80* (2014.01)
*A63F 13/2145* (2014.01)
*A63F 13/58* (2014.01)
*A63F 13/92* (2014.01)

(52) U.S. Cl.
CPC .......... *A63F 13/46* (2014.09); *A63F 13/5372* (2014.09); *A63F 13/58* (2014.09); *A63F 13/80* (2014.09); *A63F 13/95* (2014.09); *A63F 13/92* (2014.09); *A63F 2300/8094* (2013.01)

(58) Field of Classification Search
CPC .......... A63F 13/95; A63F 13/58; A63F 13/46; A63F 13/92
See application file for complete search history.

(56) References Cited

U.S. PATENT DOCUMENTS

2016/0171835 A1* 6/2016 Washington .......... A63F 13/822
463/25
2017/0072311 A1 3/2017 Maejima et al.

OTHER PUBLICATIONS

Screen shots (21 pages of example screen shots) from Playing "Wind Puzzle Colorful", YouTube [online] [video]URL, https://www.youtube.com/watch?v=Oh5LxTxH3KM published on Jan. 21, 2015.

* cited by examiner

C

C   D

D

EMPTY DISHES
(ATTACKING OBJECT)

| SLOT NUMBER | STATE | NUMBER OF DISHES | COLOR |
|---|---|---|---|
| 1 | PROVIDED | 6 | GREEN |
| 2 | PROVIDED | 3 | YELLOW |
| 3 | PROVIDED | 8 | BLUE |
| 4 | EMPTY | 0 | -- |
| 5 | EMPTY | 0 | -- |

COMPUTER-READABLE NON-TRANSITORY STORAGE MEDIUM HAVING GAME PROGRAM STORED THEREIN, GAME PROCESS CONTROL METHOD, AND GAME APPARATUS

CROSS REFERENCE TO RELATED APPLICATION

The disclosure of Japanese Patent Application No. 2017-79563, filed on Apr. 13, 2017, is incorporated herein by reference.

FIELD

The exemplary embodiments relate to a computer-readable non-transitory storage medium having a game program stored therein, a game process control method, and a game apparatus that use a touch panel, and more particularly relate to a computer-readable non-transitory storage medium having a game program stored therein, a game process control method, and a game apparatus that allow an object to be controlled by performing a touch input a plurality of times so as to match predetermined timing.

BACKGROUND AND SUMMARY

Hitherto, a type of a puzzle game has been known in which a plurality of objects are eliminated by tracing the objects with a finger or the like.

In the puzzle game as described above, at the stage of performing an operation for eliminating objects with a finger, movement of each object to be eliminated is small, or each object to be eliminated almost does not move. Thus, the operation is monotonous, resulting in monotony of the game.

Therefore, it is an object of the exemplary embodiments to provide a technique to further improve the entertainment characteristics of a game by further enhancing the action characteristics and the strategic characteristics of the game while maintaining simple operability of the game.

In order to attain the object described above, for example, the following configuration examples are exemplified.

A configuration example is directed to a computer-readable non-transitory storage medium having stored therein a game program executed by a computer of an information processing apparatus, the game program causing the computer to execute the steps of: displaying objects moving on a plurality of paths within a virtual space along movement directions that are set for the paths, respectively; determining whether a plurality of the objects that satisfy a predetermined condition have been designated, when an operation input has been performed, and causing the plurality of the designated objects to enter a state of being selected, when it is determined that the plurality of the objects that satisfy the predetermined condition has been designated; and performing, at predetermined timing, control in which a display manner of selected objects that are the objects in the state of being selected is changed or each selected object is eliminated from the path.

According to the above configuration example, a game process having high action characteristics in which continuously moving objects are linked at good timing to be acquired, can be provided.

In another configuration example, in the determining step, when at least a condition that a plurality of the objects are present on the paths different from each other is satisfied, it may be determined that the predetermined condition is satisfied. Furthermore, in the determining step, when a condition that a plurality of the objects are present on the same path is satisfied, it may be determined that the predetermined condition is satisfied.

According to the above configuration example, the entertainment characteristics of the game can be further enhanced as compared to the case of merely acquiring objects.

In still another configuration example, the plurality of paths may be parallel to each other, and the movement directions that are set for the plurality of paths, respectively, may include at least directions, at adjacent paths, which are opposite to each other.

According to the above configuration example, the moving manners of the objects can be varied, and thus the entertainment characteristics of the game can be enhanced.

In still another configuration example, in the determining step, when an operation input of consecutively designating a plurality of the objects one by one has been performed, if a condition that any other object is not present on a line connecting the last selected object and the currently selected object is satisfied, it may be determined that the predetermined condition is satisfied.

According to the above configuration example, as compared to the case of merely acquiring objects, development of the game can be inhibited from becoming monotonous, and the entertainment characteristics of the game can be enhanced more.

In still another configuration example, a first attribute and a second attribute may be set for each of the objects, and in the determining step, when a condition that the first attributes of the plurality of the designated objects are the same is satisfied, it may be determined that the predetermined condition is satisfied. Furthermore, the second attribute may be used for a process of point addition to a score within a game.

According to the above configuration example, the configurations of the objects can be diversified, and the entertainment characteristics of the game can be enhanced more.

In still another configuration example, in the control performing step, moving speeds of the objects may further be controlled. For example, in the control performing step, when a state where the same object is designated or selected has continued for a predetermined time period or longer, moving speeds of the objects moving along the paths may be changed.

According to the above configuration example, the action characteristics of the game can be enhanced. In addition, regarding the moving speeds of the objects, for example, by changing the moving speeds of the objects such that the moving speeds of the objects increase, more objects are allowed to be acquired in a short time, if the skill of the player in the game is improved, so that it is possible to more enhance the entertainment characteristics of the game.

In still another configuration example, in the control performing step, additional control, in which the display manner of the objects on the paths is changed or the objects are eliminated from the paths on the basis of a program process that is based on an operation input of an opponent or not based on an operation input, may be performed. In addition, the additional control may be performed only on the objects on a part of the plurality of paths. Moreover, in the control performing step, a process of displaying an object on a path different from the paths within the virtual space such that a display manner of the object is changed or the object is eliminated on the basis of a program process that is based on an operation input of an opponent or not based on an operation input, may be further performed.

According to the above configuration example, for example, an action puzzle game in which continuously moving objects are linked at good timing to be acquired can be provided as a versus type game to the player, and a versus game having higher entertainment characteristics can be provided. In addition, a factor of the player and the opponent scrambling for only the objects on a part of the plurality of paths can be added, and the entertainment characteristics of the versus game can be enhanced more.

Another configuration example is directed to a computer-readable non-transitory storage medium having stored therein a versus game program executed by a computer of an information processing apparatus, the game program causing the computer to execute the steps of: displaying a plurality of objects in each of a player-side field, an opponent-side field, and a common field disposed within a virtual game space; and performing, at predetermined timing, control in which, on the basis of an operation input of designating a plurality of the objects, a display manner of the plurality of the designated objects is changed or each designated object is eliminated from a path. In the control performing step, control in which a display manner of a plurality of the objects is changed or each of the plurality of the objects is eliminated from the path on the basis of a process based on an operation input of a player, is performed on the player-side field; control in which a display manner of a plurality of the objects is changed or each of the plurality of the object is eliminated from the path on the basis of a program process that is based on an operation input of an opponent or not based on an operation input, is performed on the opponent-side field; and control in which a display manner of a plurality of the objects is changed or each of the plurality of the objects is eliminated from the path both on the basis of a process based on an operation input of the player and in a program process that is based on an operation input of the opponent or not based on an operation input, is performed on the common field.

According to the above configuration example, a game field in which the player and the opponent scramble for objects can be provided, and the entertainment characteristics of the versus game can be enhanced more.

Another configuration example is directed to a computer-readable non-transitory storage medium having stored therein a versus game program executed by a computer of an information processing apparatus, the game program causing the computer to execute the steps of: displaying a plurality of objects within a virtual space; acquiring, on the basis of an operation input of designating a plurality of the objects that satisfy a predetermined condition, the plurality of the designated objects; and performing control for attacking an opponent within the virtual space by using the plurality of the acquired objects. In the control performing step, control of an attack against the opponent is performed at arbitrary timing based on an operation input of a player on the acquired object.

According to the above configuration example, a versus game in which an attack is made by using acquired objects can be provided, and a versus game in which timing of using the objects (attack timing) can be arbitrary timing for the player can be provided. Accordingly, a game having high entertainment characteristics with increased strategic characteristics can be provided.

In still another configuration example, in the control performing step, when the number of the acquired objects exceeds a predetermined value, control of an attack against the opponent using the acquired objects may be automatically performed without an operation input of the player. In addition, a first attribute and a second attribute may be set for each of the objects, and in the control performing step, the first attribute may be used for setting an amount of damage to the opponent. Furthermore, in the control performing step, when the objects the first attributes of which are the same are consecutively used, the amount of damage to the opponent may be increased from that when the objects the first attributes of which are different are used. Moreover, the second attribute may be used for a process of point addition to a score within a game.

According to the above configuration example, a method for attacking the opponent can be diversified. In addition, a plurality of attributes can be provided to each object that is an acquisition target, one of the attributes is used for calculation of a damage amount (attacking power), and the other attribute is used for uses other than calculation of a damage amount, whereby it is possible to use objects having various configurations. Accordingly, the entertainment characteristics of the game can be further enhanced.

According to the present embodiment, a game having high entertainment characteristics can be provided.

DETAILED DESCRIPTION OF NON-LIMITING EXAMPLE EMBODIMENTS

Hereinafter, an embodiment will be described. First, the configuration of a game apparatus that is an example of an information processing apparatus used in the present embodiment will be described.

(Game Apparatus)

Figure 1:
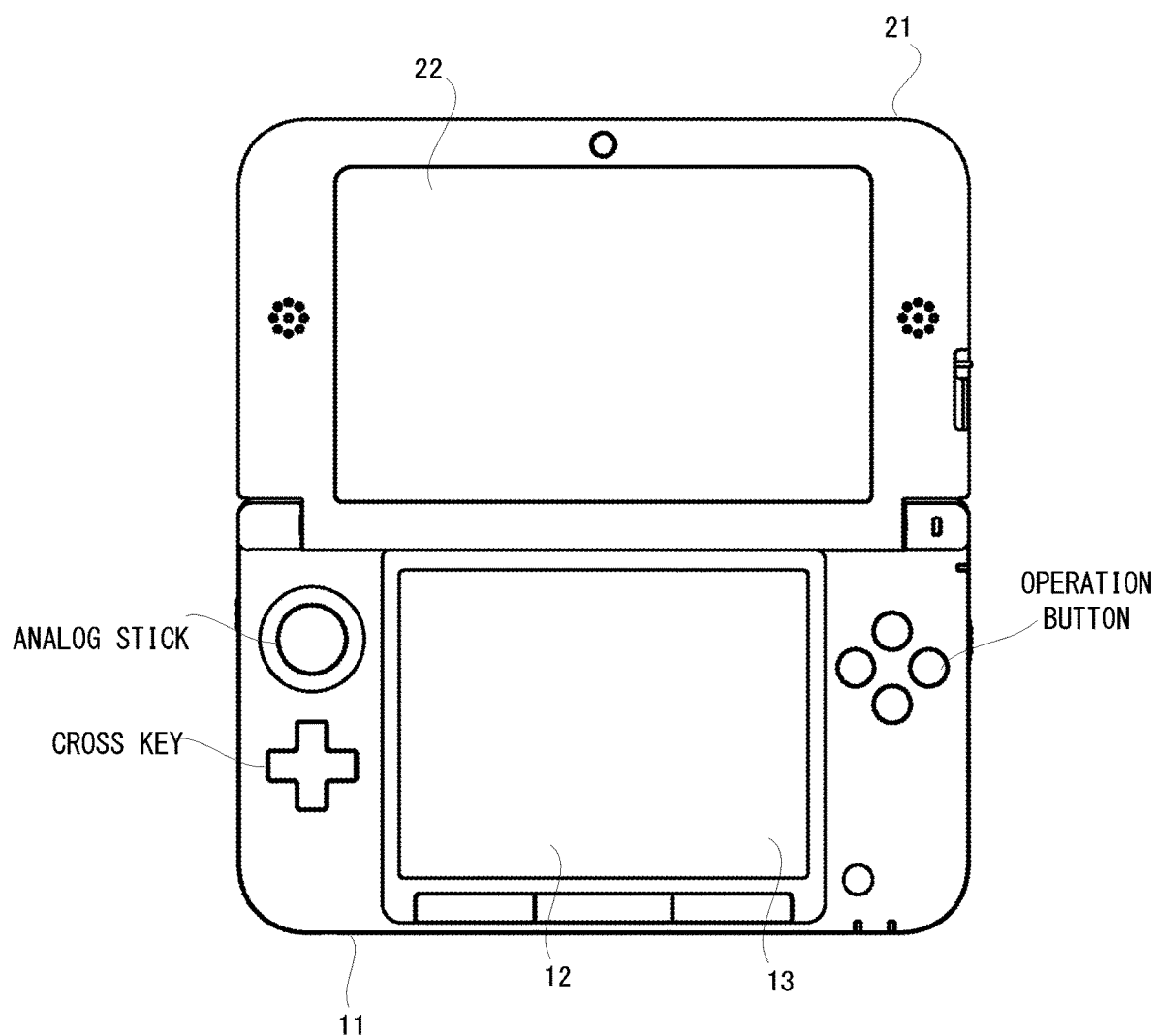
FIG. 1 is an external view of a hand-held game apparatus 10 according to an embodiment.

A game apparatus 10 assumed in the present embodiment is a hand-held game apparatus. As shown in FIG. 1, the hand-held game apparatus 10 includes a lower housing 11 and an upper housing 21. The lower housing 11 and the upper housing 21 are connected to each other so as to be openable and closable (foldable). A lower LCD (Liquid Crystal Display: liquid crystal display device) 12 and a touch panel 13 are provided in the lower housing 11. In addition, in the lower housing 11, each operation button, an analog stick, and the like are also provided. Meanwhile, an upper LCD (Liquid Crystal Display: liquid crystal display device) 22 is provided in the upper housing 21.

Figure 2:
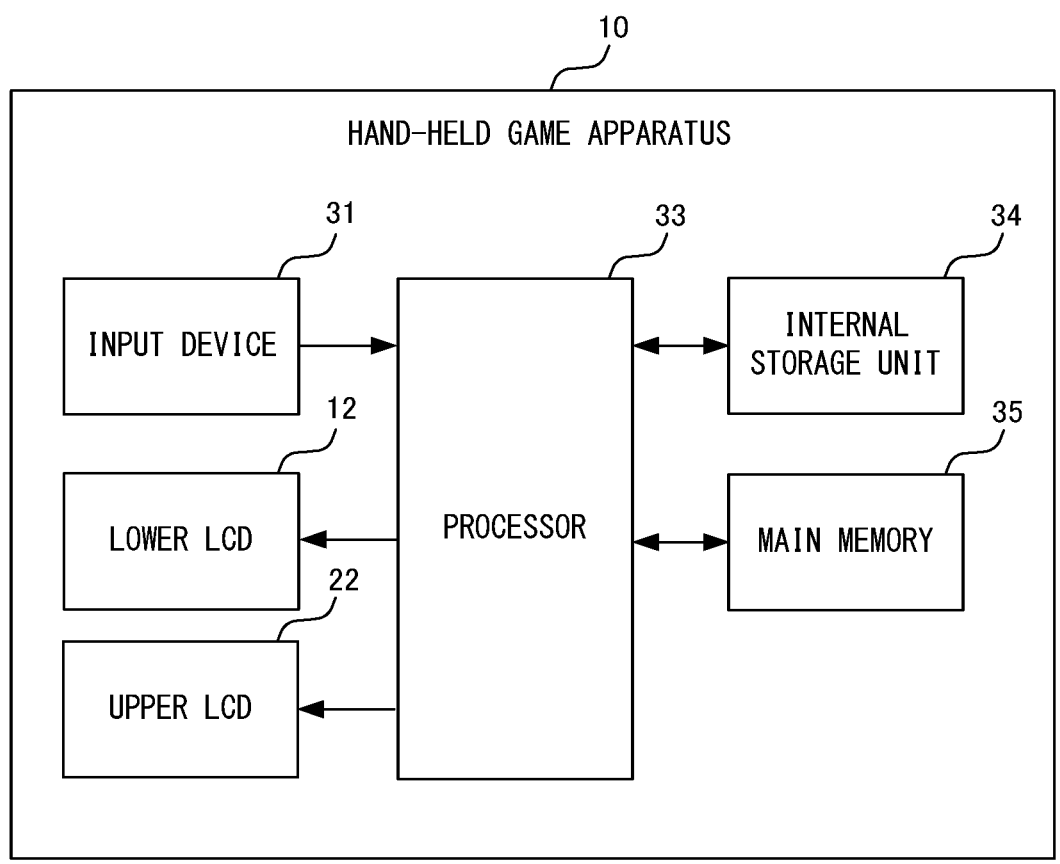
FIG. 2 is a block diagram showing a non-limiting example of the configuration of the hand-held game apparatus 10.

FIG. 2 is a schematic diagram showing the internal electrical configuration of the game apparatus 10. In FIG. 2, the hand-held game apparatus 10 includes an input device 31, the lower LCD 12, the upper LCD 22, a processor section 33, an internal storage unit 34, and a main memory 35.

The input device 31 is operated by the user of the hand-held game apparatus 10 and outputs a signal corresponding to the operation of the user. The input device 31 is, for example, the touch panel 13, each operation button, and the analog stick in FIG. 1. The lower LCD 12 and the upper LCD 22 displays, on screens thereof, images generated in the hand-held game apparatus 10. In the internal storage unit 34, a computer program to be executed by the processor section 33 is stored. The internal storage unit 34 is typically a flash EEPROM. Instead of the internal storage unit 34, an attachable/detachable storage medium (e.g., a memory card) may be used. The main memory 35 temporarily stores the computer program and information.

(Outline of Game Process)

Next, an outline of a game process assumed in the present embodiment will be described. In the present embodiment, a versus-type puzzle game is assumed. However, in the following, a description will be given with, as an example, the case where an opponent is a character controlled by the processor section 33. In another embodiment, the opponent may be a character operated by another player. For example, this case is a case where hand-held game apparatuses 10 are wirelessly connected to each other and a communication versus game is played.

Figure 3:
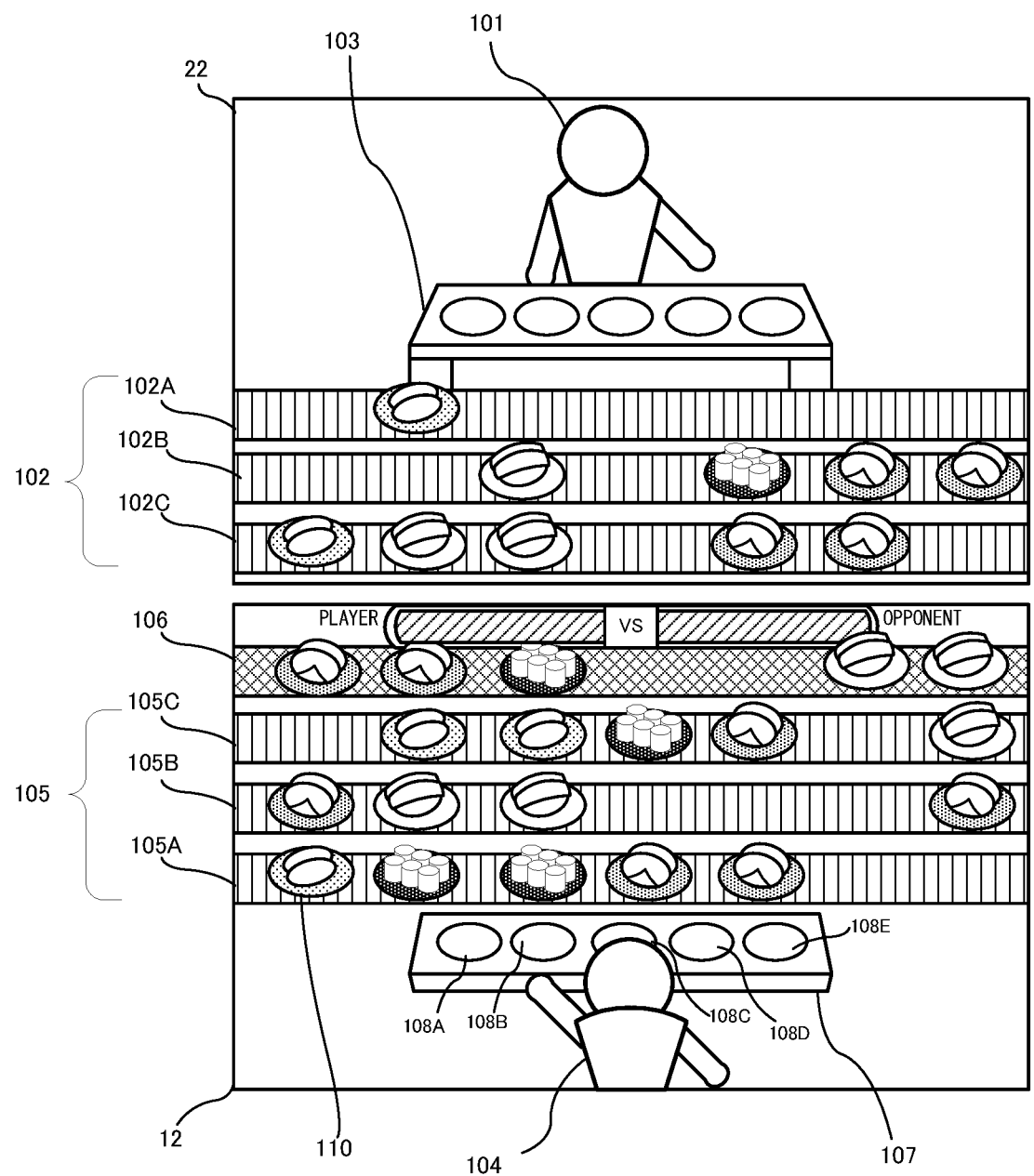
FIG. 3 is a diagram showing a non-limiting example of a game screen of the embodiment.

FIG. 3 shows an example of a game screen according to the present embodiment. In FIG. 3, an opponent character 101, an opponent-side game field 102, and an opponent-side stock area 103 are displayed on the upper LCD 22. More specifically, the opponent-side game field 102 is composed of opponent-side lane objects 102A to 102C (hereinafter, referred to as an opponent-side lane). In addition, a player character 104, an own-side game field 105, a common game field 106, and an own-side stock area 107 are displayed on the lower LCD 12. Specifically, the own-side game field 105 is composed of own-side lane objects 105A to 105C (hereinafter, referred to as an own-side lane). In addition, the common game field 106 is composed of a single common lane object 106 (hereinafter, referred to as a common lane). One game space is displayed such that the contents displayed on the upper LCD 22 and the contents displayed on the lower LCD 12 are matched with each other.

A plurality of acquisition target objects 110 are disposed on each of the own-side lane 105, the opponent-side lane 102, and the common lane 106. These acquisition target objects 110 are moving on the lanes along movement directions that are set for the lanes, respectively (in other words, the position of each acquisition target object continues to change). The acquisition target objects 110 are objects having a motif of "sushi" (more specifically, representing conveyer-belt sushi). In this game, a player acquires the acquisition target objects 110 moving on the lanes and attacks an opponent by using the acquired acquisition target objects 110.

Here, the acquisition target objects 110 that can be acquired by the player are the acquisition target objects 110 moving on the own-side lane 105 and the common lane 106. In addition, the acquisition target objects 110 that can be acquired by the opponent character 101 are the acquisition target objects 110 moving on the opponent-side lane 102 and the common lane 106. That is, both the player and the opponent (processor section 33) are allowed to acquire the acquisition target objects 110 on the common lane 106. In other words, the player and the opponent scramble for the acquisition target objects 110 on the common lane 106, which enhances the entertainment characteristics of the game. Thus, as shown in FIG. 3, the common lane 106 is located between the own-side lane 105 and the opponent-side lane 102.

Figure 4:
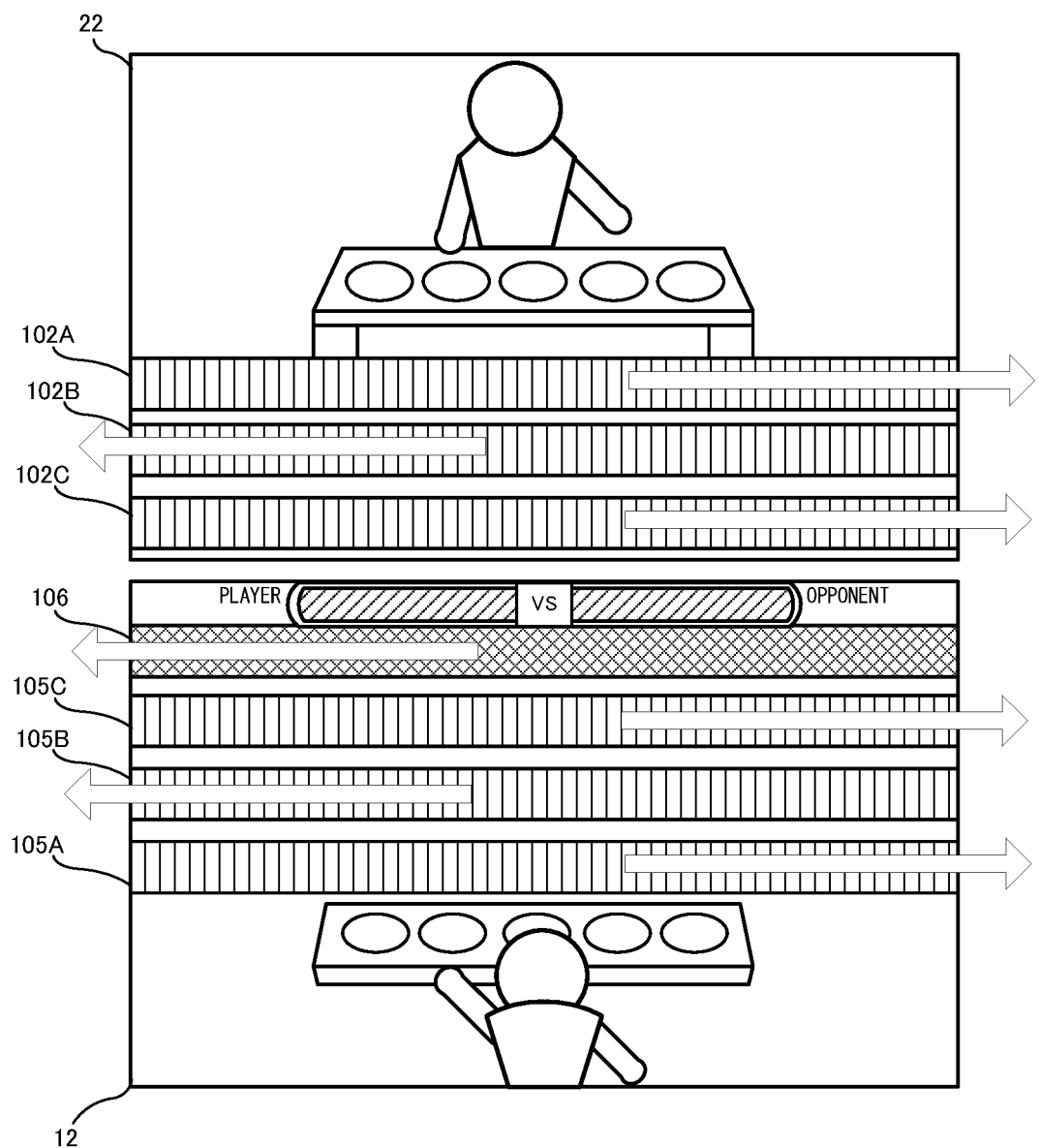
FIG. 4 is a diagram showing a non-limiting example of the game screen of the embodiment.

Next, the movement directions (of the acquisition target objects 110) set for the lanes, respectively, will be described with reference to FIG. 4. In this example, the movement direction at each lane is set such that the movement directions are alternately opposite directions. In the example of FIG. 4, the movement directions at the opponent-side lanes 102A and 102C and the own-side lanes 105A and 105C are the rightward direction in the screen. In addition, the movement directions at the opponent-side lane 102B, the common lane 106, and the own-side lane 105B are the leftward direction in the screen. That is, the movement direction at each lane is set such that the "right" movement direction and the "left" movement direction are alternated. When each acquisition target object 110 on each lane reaches any of the right and left edges of the screen, the acquisition target object 110 is eliminated from the screen in such a manner that the acquisition target object 110 moves out of the screen.

(Acquisition Operation)

Next, an outline of an acquisition operation for acquiring the above acquisition target objects and an outline of an attack method will be described. First, the outline of the acquisition operation will be described. In this game, the player can acquire individual acquisition target objects moving on the lanes, by touching the acquisition target objects with a stylus so as to link the acquisition target objects. As described above, the player can acquire the acquisition target objects 110 moving on the own-side lane 105 and the common lane 106. Thus, on these lanes, the player can acquire the acquisition target objects 110 by performing an operation so as to link the acquisition target objects on different lanes. In addition, the player can acquire the acquisition target objects 110 by performing an operation of moving the stylus across the lane, in addition to moving the stylus on the adjacent lanes. Moreover, the player can acquire the acquisition target objects 110 even when performing an operation of linking the acquisition target objects 110 on the same lane.

Here, each acquisition target object 110 has a motif of "sushi" as described above, and includes a "dish" part and an "ingredient" part (object on the dish) (in other words, each acquisition target object 110 has two different attributes). Several types are set as the "dishes", and are indicated in different colors, respectively (the color of each dish indicates the price of "sushi", and the price is related to attacking power described later). The player can acquire acquisition target objects having the same dish color by performing an operation of touching the acquisition target objects so as to link the acquisition target objects. More types of "ingredients" than the types of "dishes" are set. Thus, even acquisition target objects having dishes of the same color may have different ingredients.

Figure 5:
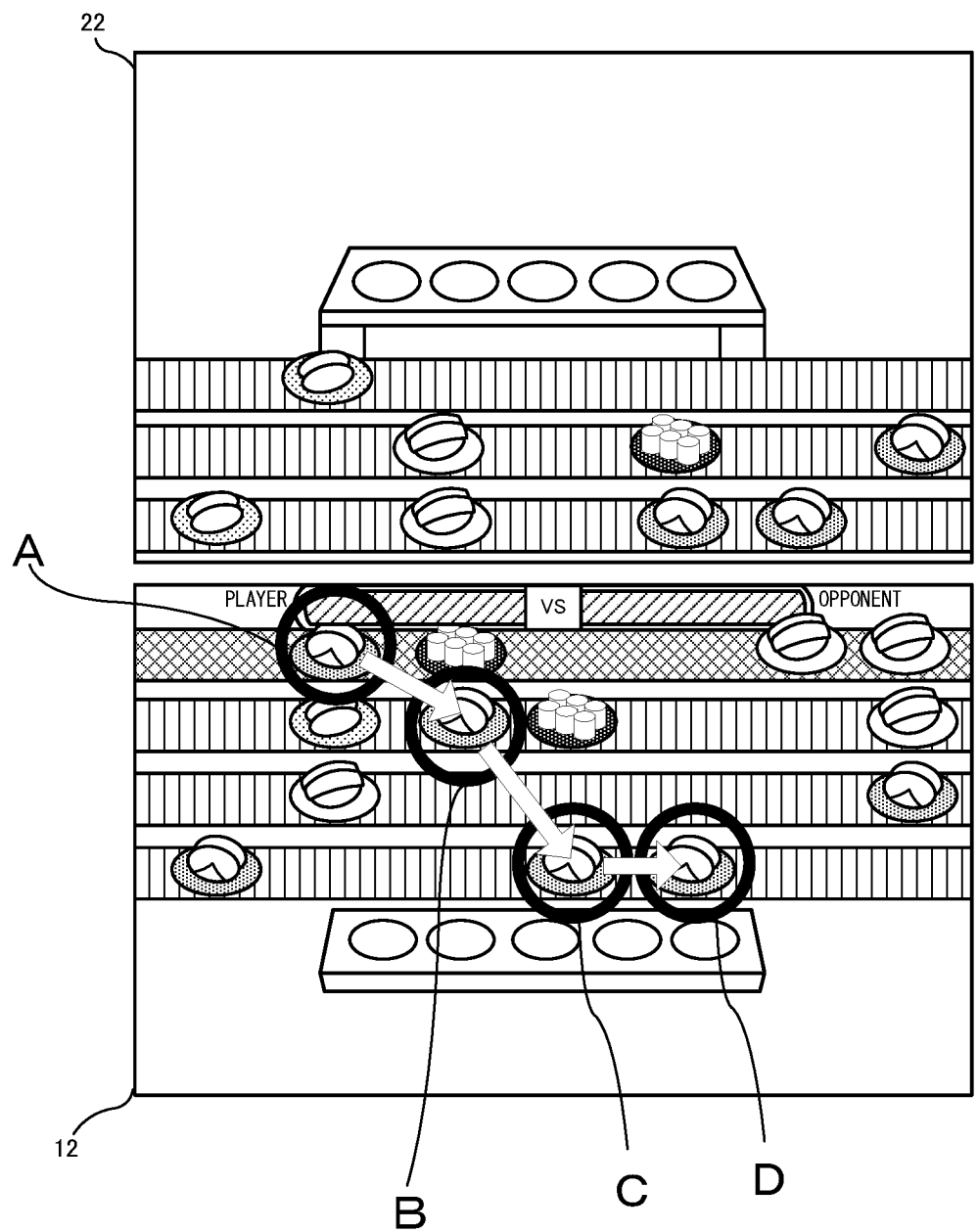
FIG. 5 is a diagram showing a non-limiting example of the game screen of the embodiment.
Figure 6:
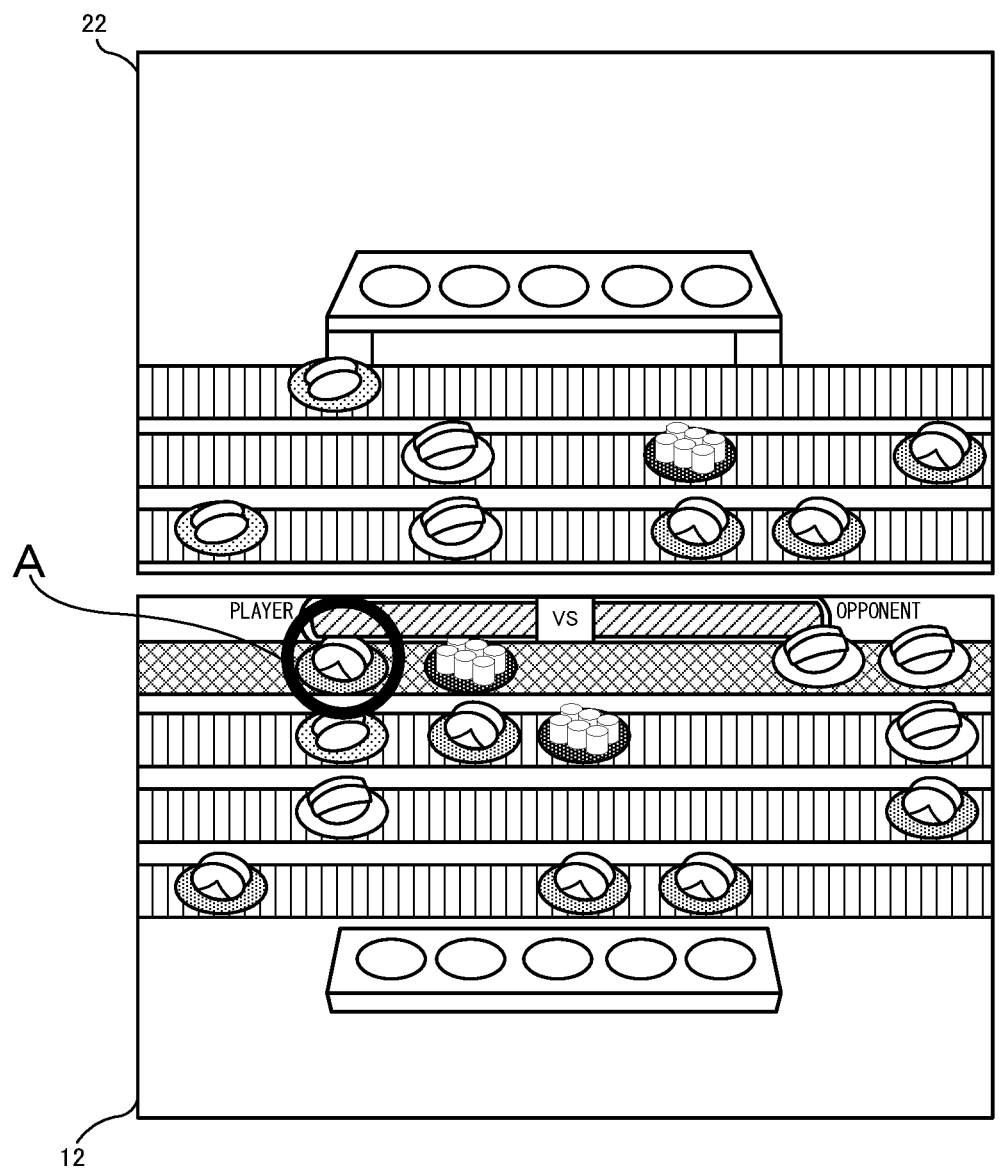
FIG. 6 is a diagram showing a non-limiting example of the game screen of the embodiment.
Figure 7:
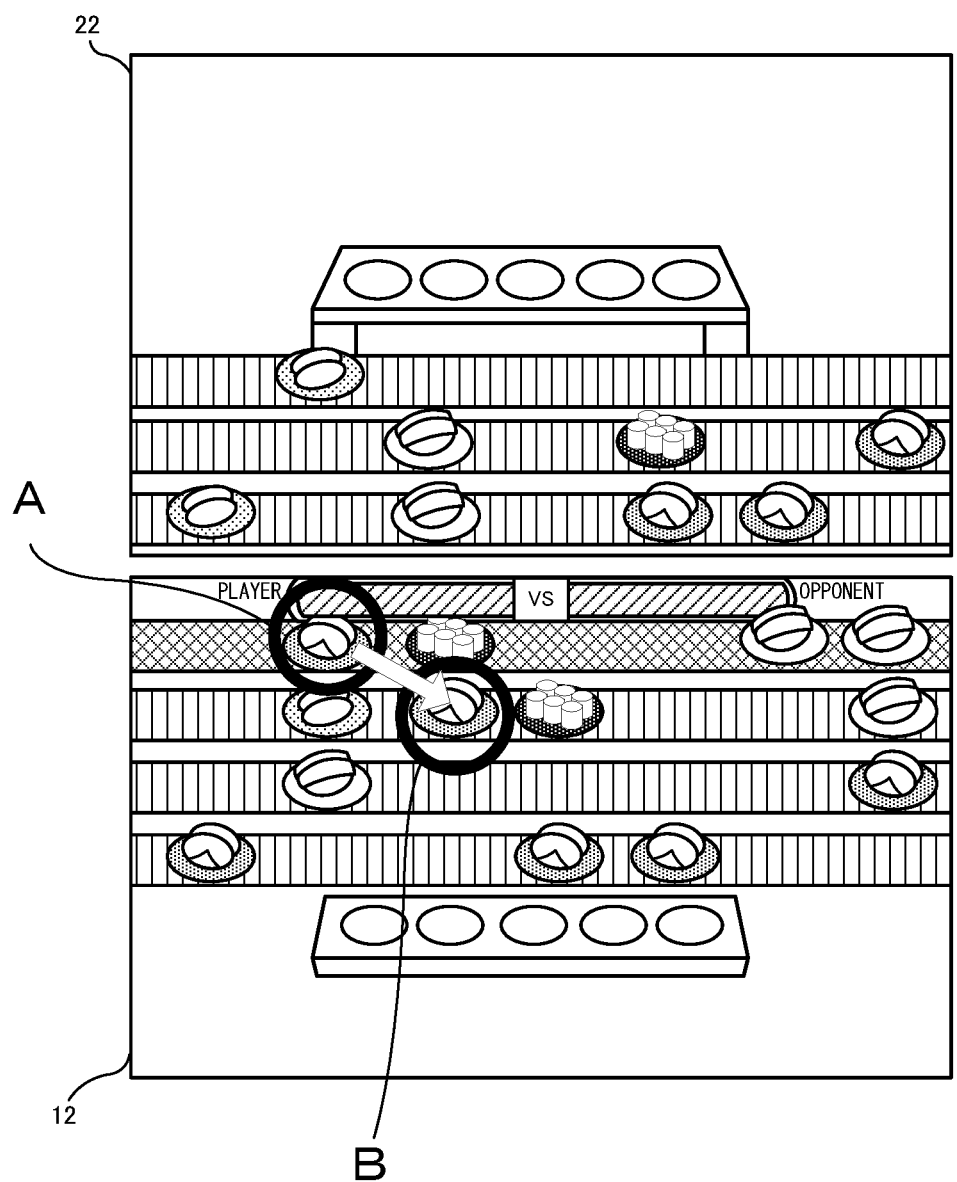
FIG. 7 is a diagram showing a non-limiting example of the game screen of the embodiment.
Figure 8:
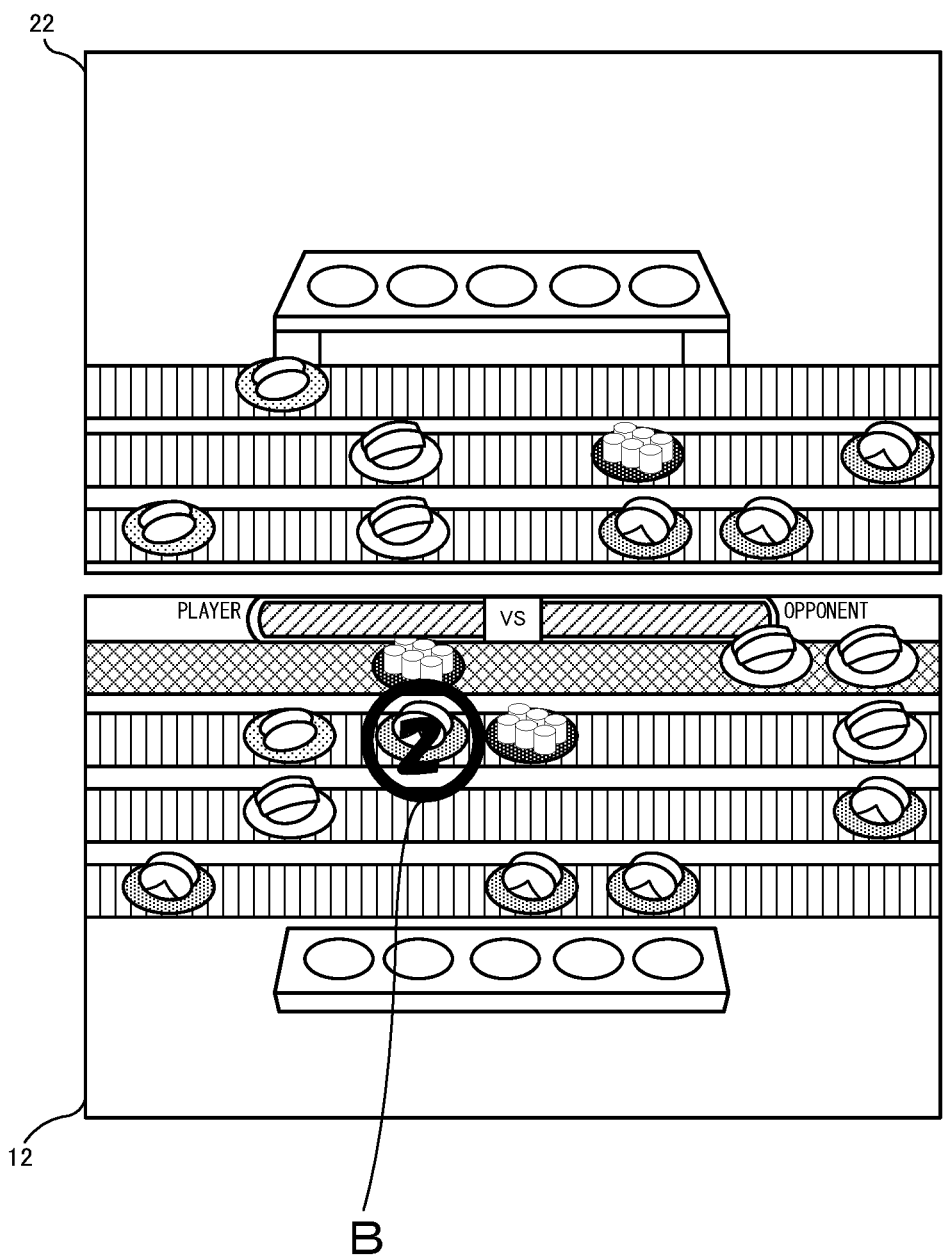
FIG. 8 is a diagram showing a non-limiting example of the game screen of the embodiment.
Figure 9:
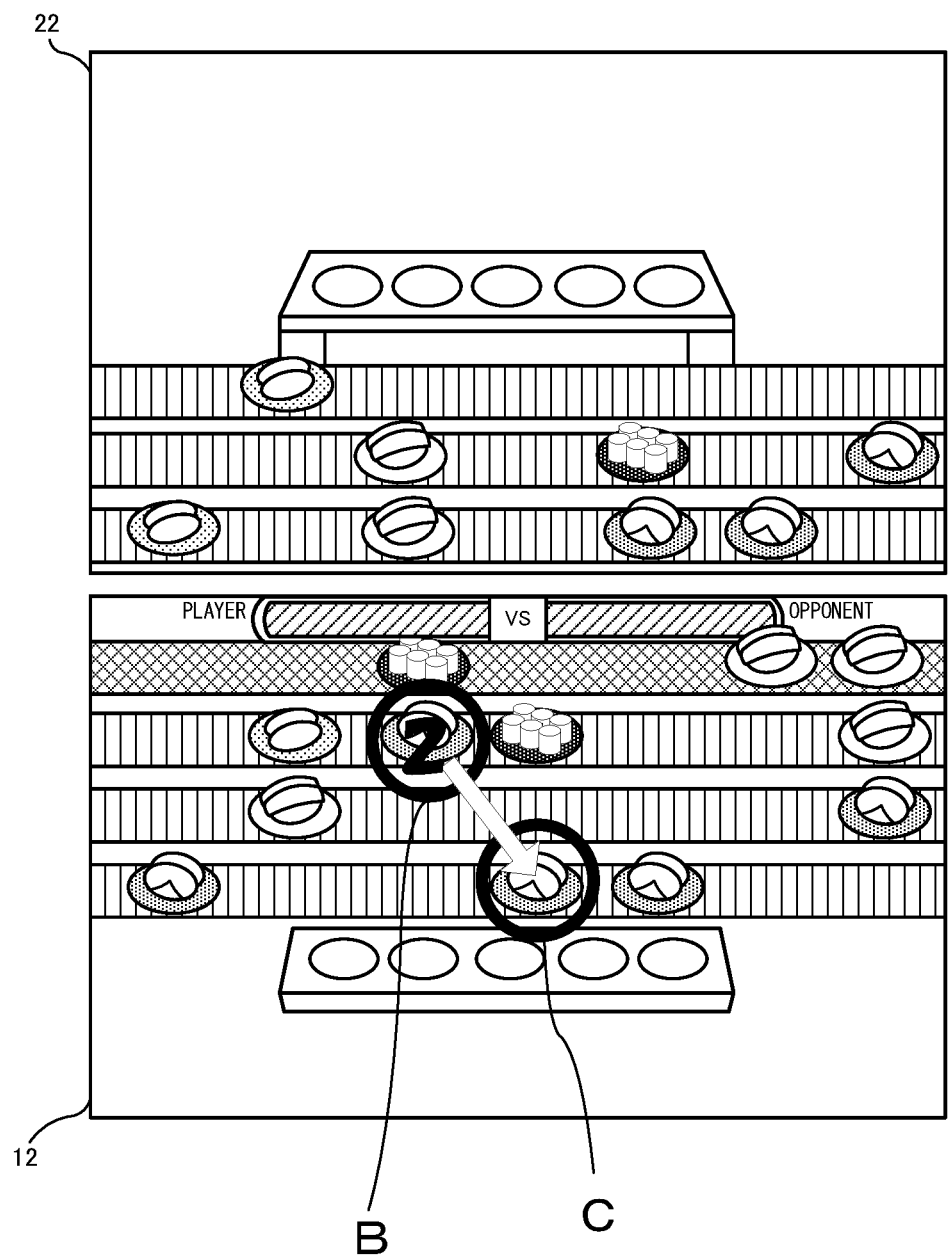
FIG. 9 is a diagram showing a non-limiting example of the game screen of the embodiment.
Figure 10:
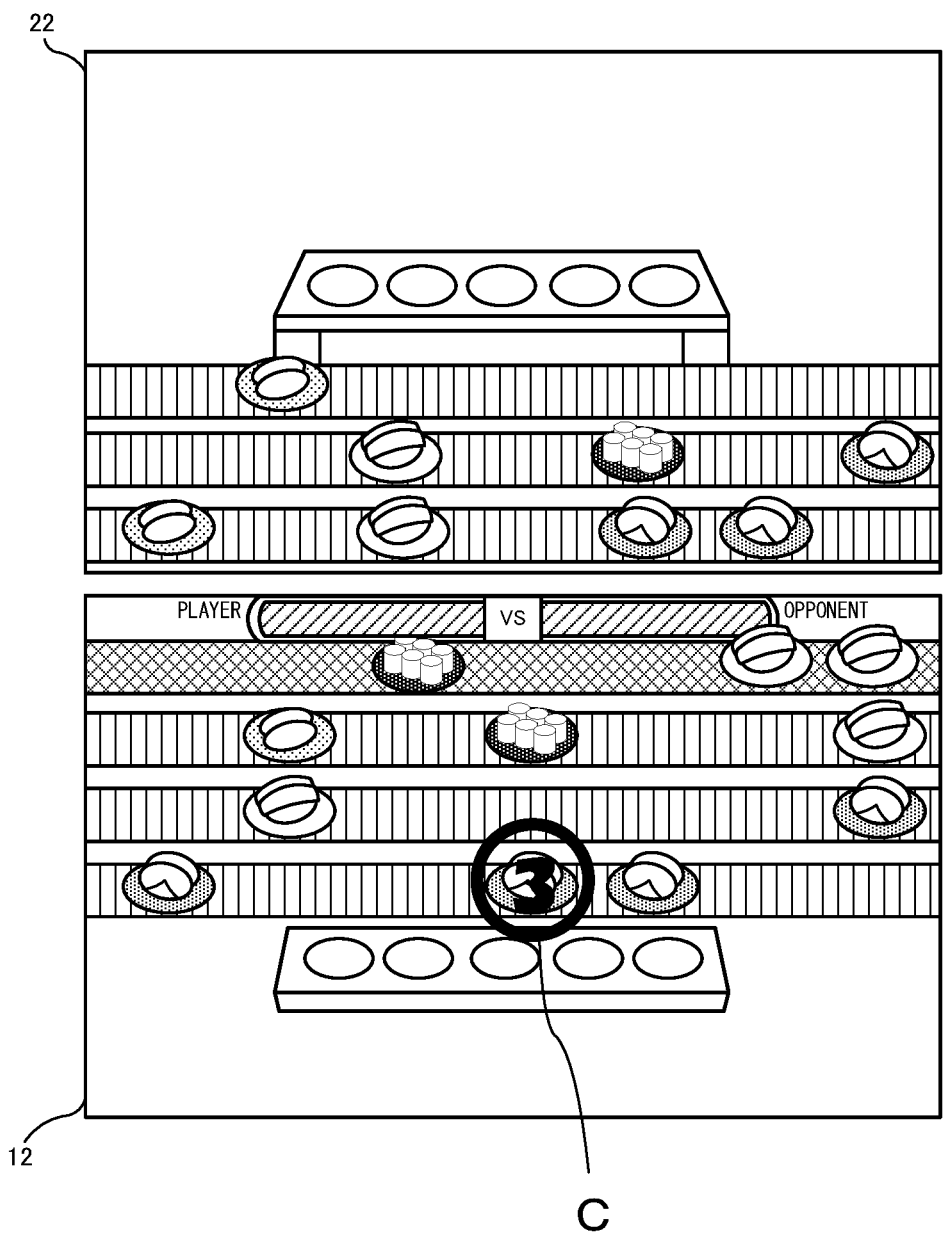
FIG. 10 is a diagram showing a non-limiting example of the game screen of the embodiment.
Figure 11:
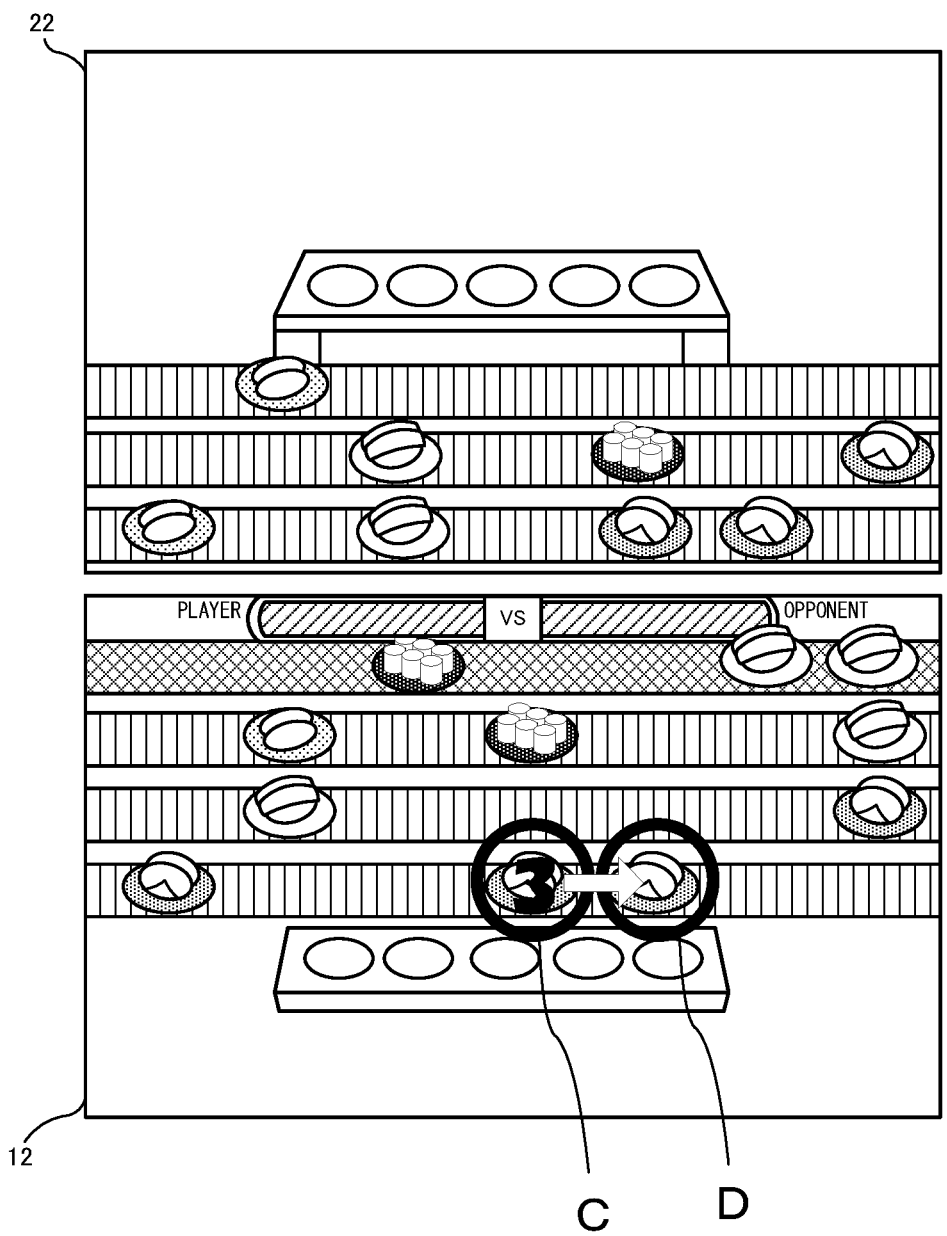
FIG. 11 is a diagram showing a non-limiting example of the game screen of the embodiment.
Figure 12:
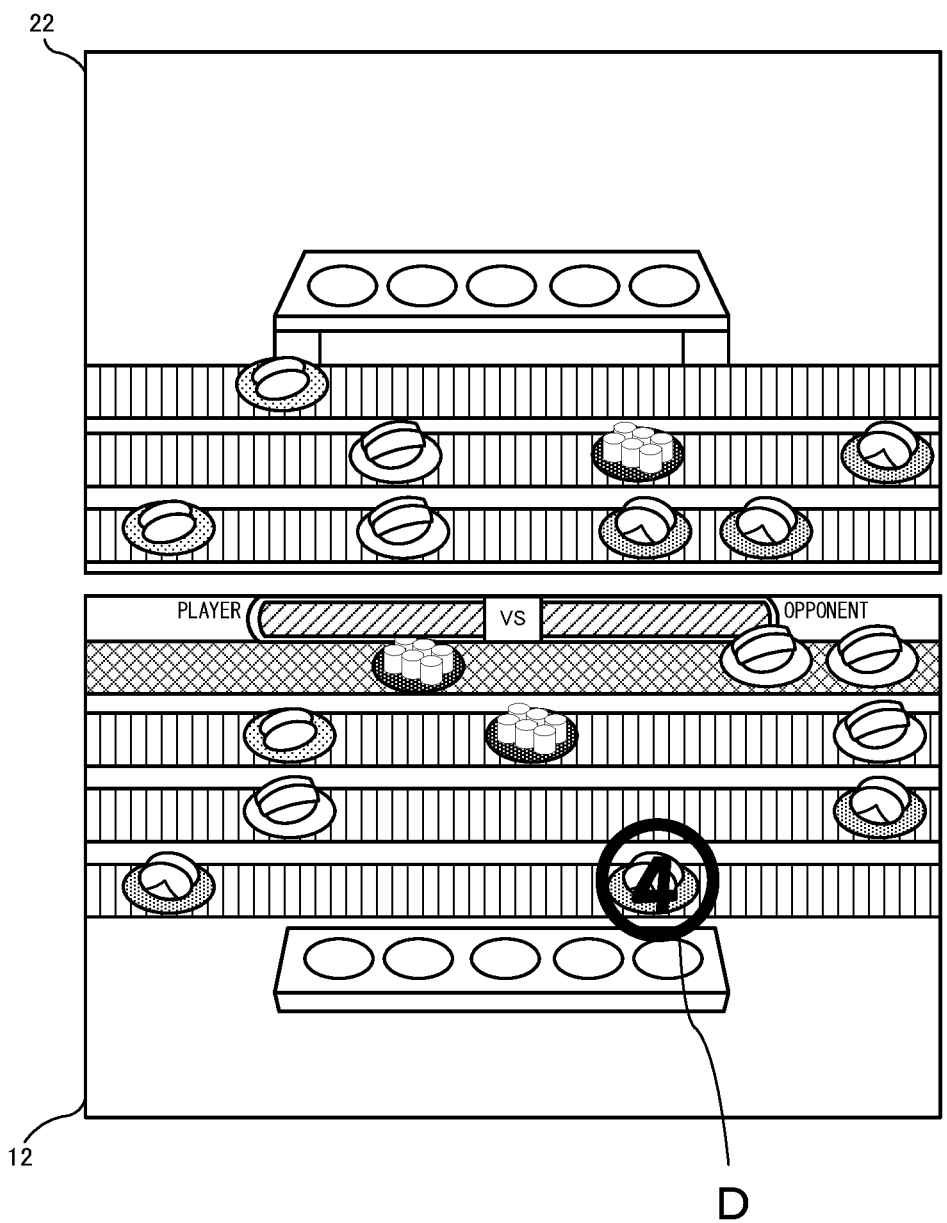
FIG. 12 is a diagram showing a non-limiting example of the game screen of the embodiment.

An example of the acquisition operation will be described with reference to the drawings. Here, the case of acquiring the acquisition target objects 110 having dishes of the same color by linking the acquisition target objects 110 in order of A→B→C→D as shown by circle marks in FIG. 5 in a state in FIG. 5 is taken as an example (for convenience of explanation, the player character 104 and the opponent character 101 are not shown). Hereinafter, "link" is sometimes referred to as "connect". First, as shown in FIG. 6, the player designates the acquisition target object 110 indicated by A by touching (performing a touch-on on) this acquisition target object 110 with the stylus (or their finger or the like). Accordingly, (simultaneously with this designation operation), the acquisition target object 110 enters a "selected state". Next, as shown in FIG. 7, the player designates the acquisition target object 110 indicated by B by moving the stylus to the acquisition target object 110 indicated by B through a sliding operation such that the stylus is not separated from the touch panel (lower LCD 12). Accordingly, (if a later-described connectable condition is satisfied), the acquisition target object 110 also enters a selected state (connection from A to B). As a result, regarding the acquisition target object 110 indicated by A, an effect that the acquisition target object 110 indicated by A moves to the position of the acquisition target object 110 indicated by B is displayed, and the acquisition target object 110 indicated by A is eliminated from the original position as shown in FIG. 8. In addition, a numeral indicating the number of currently selected dishes is also displayed so as to be superimposed on the acquisition target object 110 indicated by B. In the example of FIG. 8, "2" is displayed. Subsequently, as shown in FIG. 9, the player moves the stylus from the position of the acquisition target object 110 indicated by B to the acquisition target object 110 indicated by C through a sliding operation (designates the acquisition target object 110 indicated by C). Accordingly, (if the later-described connectable condition is satisfied), the acquisition target object 110 indicated by C also enters a selected state (connection from B to C), and the acquisition target object 110 indicated by B is eliminated from the screen similarly as described above, as shown in FIG. 10. Moreover, "3" is displayed as the numeral indicating the number of selected dishes. Furthermore, as shown in FIG. 11, the player moves the stylus from the position of the acquisition target object 110 indicated by C to the acquisition target object 110 indicated by D through a sliding operation (designates the acquisition target object 110 indicated by D). Accordingly, (if the later-described connectable condition is satisfied), the acquisition target object 110 indicated by D also enters a selected state (connection from C to D), and the acquisition target object 110 indicated by C is also eliminated from the screen, as shown in FIG. 12. In addition, "4" is displayed as the numeral indicating the number of selected dishes.

Figure 13:
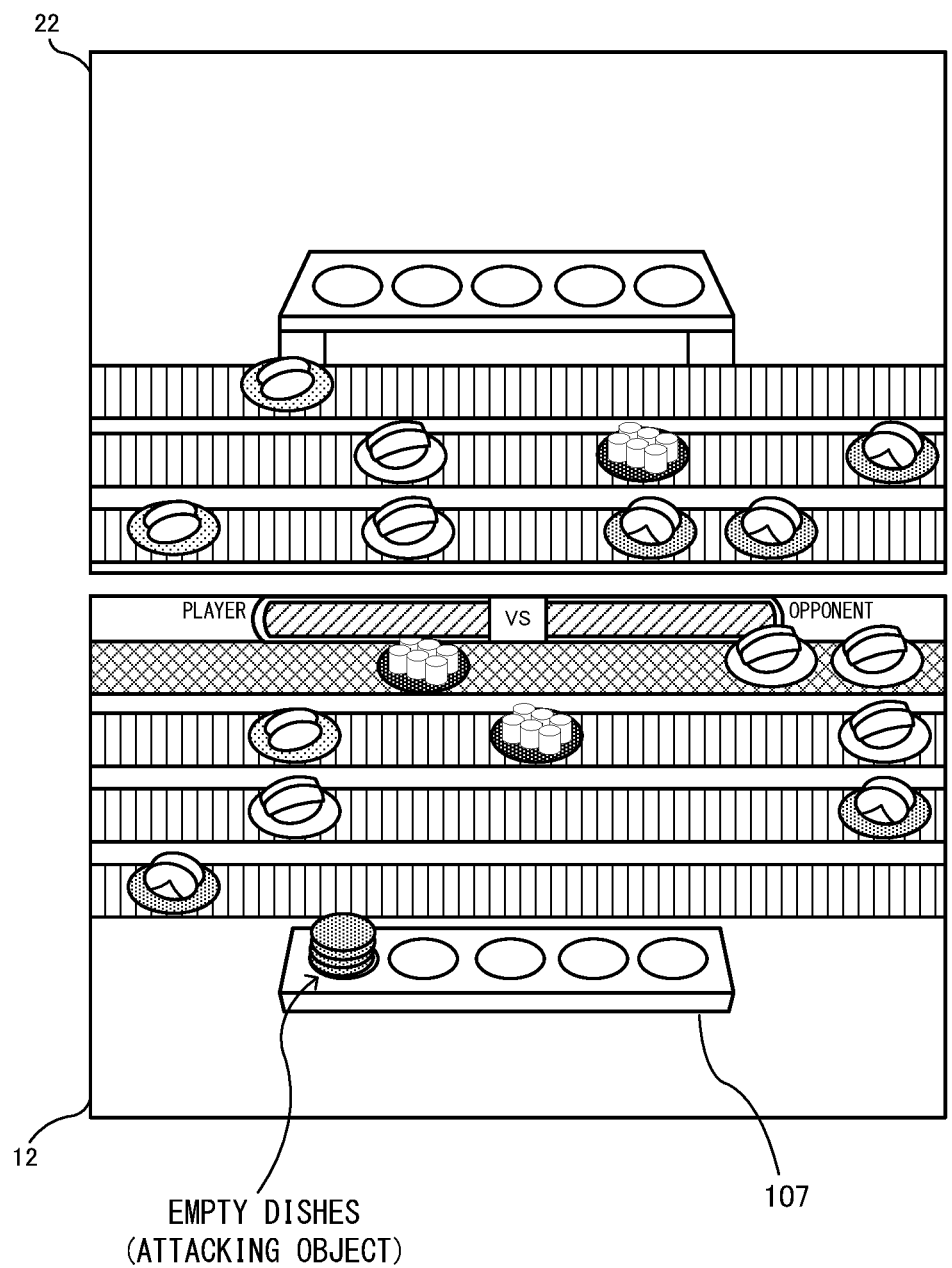
FIG. 13 is a diagram showing a non-limiting example of the game screen of the embodiment.

Thereafter, the player can fix "acquisition" of the acquisition target objects selected through the series of operations, by separating the stylus from the touch panel to perform a touch-off. On the screen, an effect that the acquisition target object 110 indicated by D moves from the position of the acquisition target object 110 indicated by D to the position of the player character 104 is displayed, and motion of the player character 104 eating sushi is displayed. Thereafter, an image in which empty dishes (that is, dishes on which sushi has been eaten) the number of which corresponds to the number of selected dishes are stacked, is displayed in the own-side stock area 107 as shown in FIG. 13.

Here, the own-side stock area 107 shown in FIG. 3 will be described (the following description can apply to the opponent-side stock area 103). As described above, the own-side stock area 107 is an area for stocking the acquisition target objects 110 acquired by the player. In FIG. 3, five slots 108A to 108E (hereinafter, sometimes collectively referred to as a slot 108) are provided to the own-side stock area 107. The above series of acquired acquisition target objects 110 are collectively disposed on the slot 108 such that the empty dishes are stacked (as objects in such an image). For convenience of explanation, the acquisition target objects 110 that are the group of the empty dishes are referred to as an attacking object. A later-described attacking process of attacking the opponent character 101 is performed by using the attacking object disposed on the slot. The attacking object is initially disposed on the slot 108A at the leftmost side. Then, each time addition of an attacking object occurs, the position of each existing attacking object shifts to the next right slot. Then, the new attacking object is disposed on the empty slot 108A at the left end. In the case of disposing a sixth attacking object in a state where five attacking objects are disposed, later-described "automatic attack" occurs.

Figure 14:
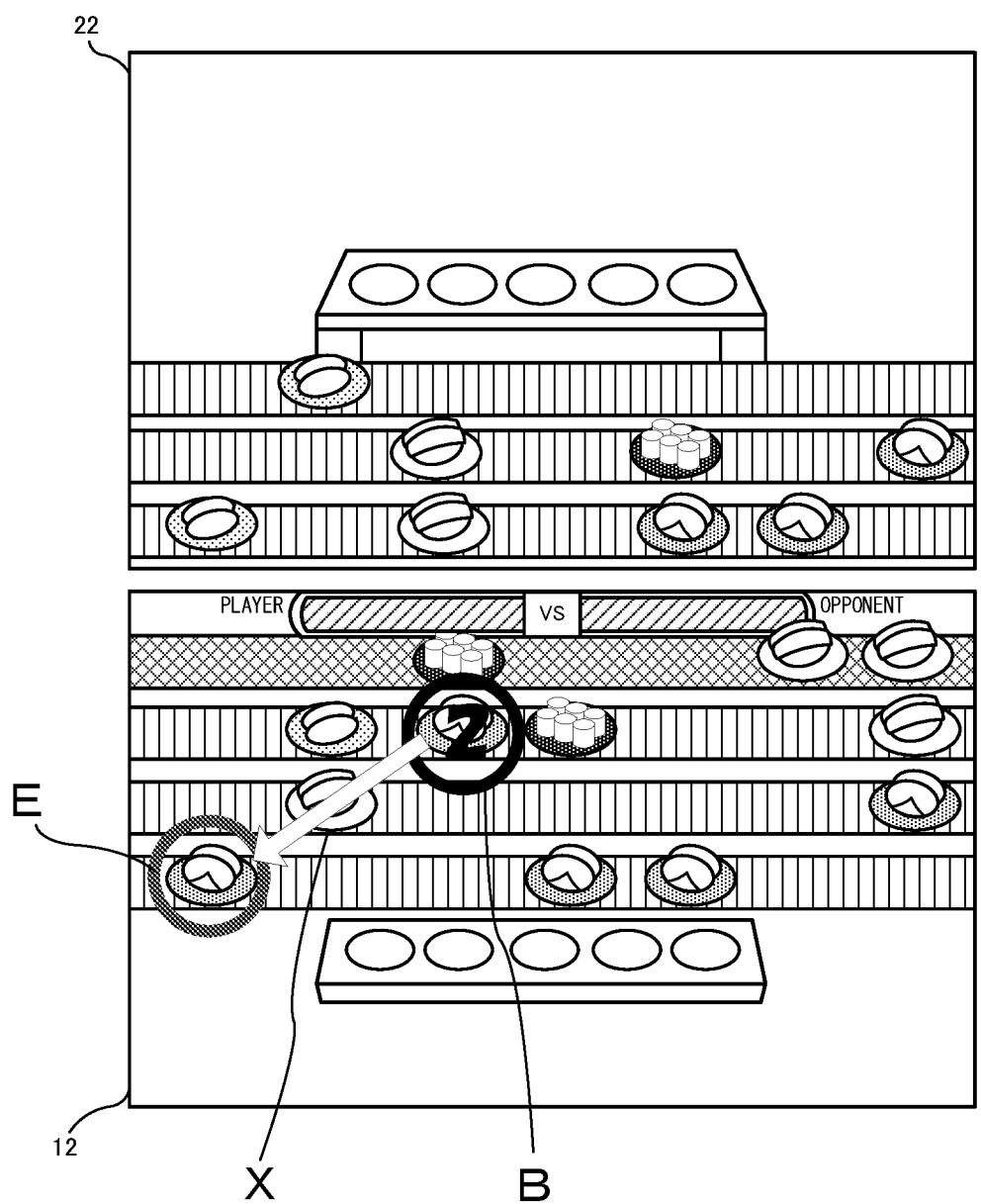
FIG. 14 is a diagram showing a non-limiting example of the game screen of the embodiment.

Meanwhile, in the acquisition operation for acquiring the acquisition target objects 110, the acquisition target objects 110 having dishes of the same color are selected and acquired by linking the acquisition target objects 110 through a sliding operation. To succeed in the acquisition, it is necessary to satisfy a predetermined condition (hereinafter, referred to as a connectable condition). Specifically, in the case as shown in FIG. 14, the acquisition target objects 110 cannot be consecutively selected (connected). FIG. 14 shows the case of performing a sliding operation toward the acquisition target object 110 indicated by E in a state where the above acquisition target object 110 indicated by B is selected. In this case, the acquisition target object 110 at X the dish of which has a different color from that of the acquisition target object 110 indicated by B and the acquisition target object 110 indicated by E is present on a trajectory from the acquisition target object 110 indicated by B to the acquisition target object 110 indicated by E. That is, the acquisition target object 110 the dish of which has a different color from that of the acquisition target object 110 indicated by B and the acquisition target object 110 indicated by E is present between the acquisition target object 110 indicated by B and the acquisition target object 110 indicated by E. In such a case, a connection from the acquisition target object 110 indicated by B to the acquisition target object 110 indicated by E cannot be established, and the acquisition target object 110 indicated by E cannot be selected. In this case, first, determination as to a connection between the acquisition target object 110 indicated by B and the acquisition target object 110 at X is performed, and the acquisition target object 110 indicated by B and the acquisition target object 110 at X are handled as being unconnectable, since the colors of the dishes of the acquisition target object 110 indicated by B and the acquisition target object 110 at X are different from each other. That is, even when an attempt to connect from the acquisition target object 110 indicated by B to the acquisition target object 110 indicated by E is made, the connection is cut due to the presence of the acquisition target object 110 at X. As a result, a connection from the acquisition target object 110 indicated by B to the acquisition target object 110 indicated by E cannot be established. In other words, when the color of the dish of the acquisition target object 110 that is a connection source is the same as the color of the dish of the acquisition target object 110 that is a connection destination and no other acquisition target object 110 is present on a line connection both acquisition target objects 110, both acquisition target objects 110 are connectable. In FIG. 14, if the acquisition target object at X is an object having the same dish color as that of the acquisition target objects indicated by B and E, the acquisition target object 110 that is a connection source becomes the acquisition target object 110 indicated by B, and the acquisition target object 110 that is a connection destination becomes the acquisition target object at X, and both acquisition target objects are determined as being connectable. Thus, it is possible to consecutively acquire the acquisition target objects 110 in order of B→X→E. Such a determination process based on the connectable condition will be described in detail later.

Since the acquisition target objects 110 are continuously moving, the above-described series of operations from a touch-on through sliding to a touch-off needs to be performed quickly to some extent (for convenience of explanation, change of the movement is not shown in FIGS. 5 to 12). For example, after the leftward moving acquisition target object 110 indicated by A is touched, if the acquisition target object 110 indicated by A moves to the left edge of the screen and disappears from the screen before a sliding operation is performed to the acquisition target object 110 indicated by B, this acquisition operation is cancelled. For example, also when the stylus is not moved after a certain acquisition target object 110 is touched, the selected acquisition target object 110 moves rightward or leftward. Thus, if the touched acquisition target object 110 disappears from the screen as a result of movement, the acquisition operation is cancelled.

In this game, when a first predetermined time period has elapsed from the time at which the acquisition target object 110 is touched, the moving speed of each acquisition target object 110 changes. For example, after the acquisition target object 110 is initially touched, when 1 second has elapsed with the acquisition target object 110 touched, the moving speed of each acquisition target object 110 slightly increases. When a touch-off is performed, the speed returns to a speed that is the speed before the change. By increasing the moving speed of each acquisition target object 110 as described above, a player who has got used to the game can establish one connection after another in a short time. That is, it is possible to cause the player to clearly feel that their skill is improved by getting used to the game, thereby maintaining player's motivation to play the game. In addition, the entertainment characteristics of the game can be enhanced.

Apart from the above change of the moving speed, in this game, when a second predetermined time period (set to a time period longer than the first predetermined time period) has elapsed from the time at which the acquisition target object 110 is initially touched, the acquisition operation at this time is automatically cancelled. For example, if a touch-off has not been performed when 7 seconds have elapsed from the time at which the acquisition target object 110 is initially touched, the series of acquisition operations at this time is cancelled regardless of the number of selected acquisition target objects 110. That is, in this game, a series of acquisition operations needed to be completed (a touch-off needs to be performed) within 7 seconds from the time when the acquisition target object 110 is initially touched. This time period is an example, and may be changed as appropriated, for example, in accordance with difficulty level setting of the game.

(Attack Method)

Next, the outline of the attack method will be described. As described above, the above attacking objects disposed in the own-side stock area 107 are used for attacking the opponent character 101 shown in FIG. 3. In this game, as the attack method, there are two types, that is, manual attack and automatic attack. The manual attack is executed on the basis of an operation of the player. Specifically, it is possible to attack the opponent character 101 by performing a flick operation in the upward direction in the screen on the attacking object disposed on any slot 108. That is, an operation as if flying the attacking object toward the opponent character 101 is performed. Accordingly, if any attacking object is located in the own-side stock area 107, the player can attack the opponent at any timing. Thus, the player does not necessarily attack the opponent as soon as the attacking object is acquired, but can attack the opponent at timing at which it is possible to more effectively damage the opponent, so that the strategic characteristics of the game can be enhanced.

Meanwhile, the automatic attack is executed when the acquisition target objects 110 are further acquired in a state where all the slots are filled. In such a case, an attack against the opponent is automatically performed by using the attacking object on the slot 108E shown at the rightmost side in FIG. 3 (the attacking object is automatically flown toward the opponent character 101). Each of the remaining four attacking objects shifts to the next right slot, whereby the slot 108A at the left end becomes empty. An attacking object based on the newly acquired acquisition target objects 110 is disposed on the empty slot 108A.

Figure 15:
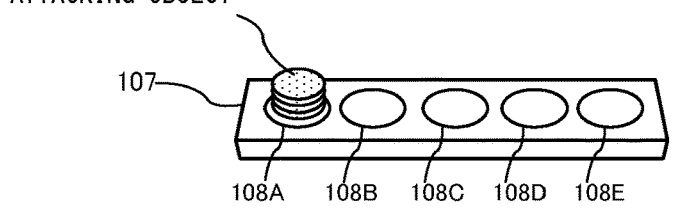
FIG. 15 is a diagram illustrating a stock area 107.
Figure 16:
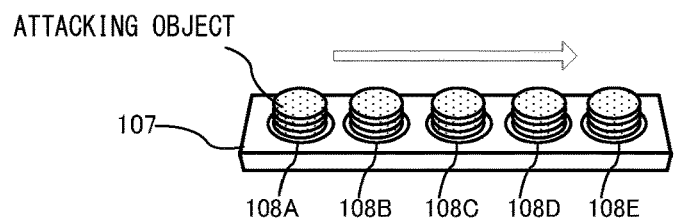
FIG. 16 is a diagram illustrating the stock area 107.
Figure 17:
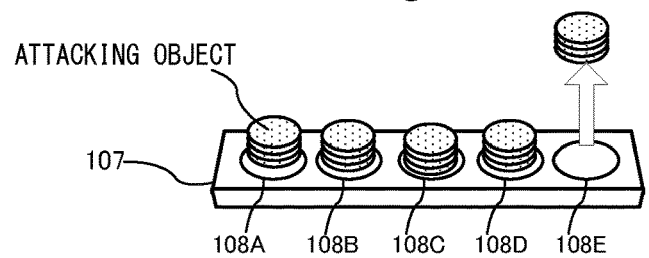
FIG. 17 is a diagram illustrating the stock area 107.
Figure 18:
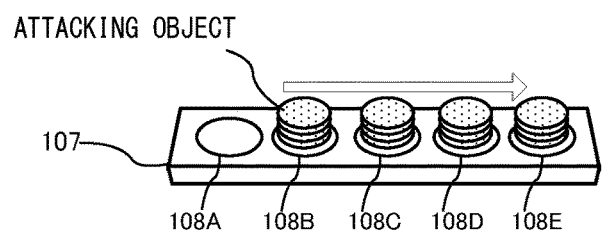
FIG. 18 is a diagram illustrating the stock area 107.
Figure 19:
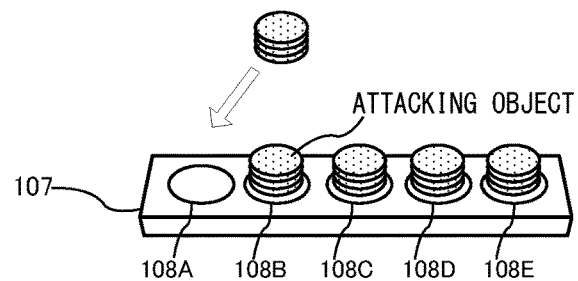
FIG. 19 is a diagram illustrating the stock area 107.

An example of specific movement of the own-side stock area 107 and the attacking objects regarding the automatic attack will be described with reference to FIGS. 15 to 19. FIG. 15 shows a state where the first attacking object is disposed. The attacking object is disposed on the slot 108A at the leftmost side. Thereafter, an operation for acquiring the acquisition target objects 110 is repeated (each existing attacking object shifts to the next right slot each time new acquisition occurs), and a state where five attacking objects are disposed is obtained as shown in FIG. 16. In this state, when the acquisition target objects 110 are newly acquired, the attacking object on the slot 108E at the rightmost side is automatically flown toward the opponent as shown in FIG. 17. Then, as shown in FIG. 18, each existing four attacking object shifts to the next right slot. As a result, the slot 108A at the left end becomes empty. Then, as shown in FIG. 19, an attacking object based on the newly acquired acquisition target objects 110 is disposed on the slot 108A.

Here, a method for calculating "attacking power" of the attacking object will be described. As described above, each of the acquisition target objects 110 includes two parts of "dish" and "ingredient". A predetermined value is defined as "attacking power" for the "dish". In addition, the "attacking power" is different depending on the color of the dish. For example, a red dish has an attacking power of 10, a blue dish has an attacking power of 20, and a yellow dish has an attacking power of 50. In addition, the attacking power is increased in accordance with the number of acquisition target objects (the number of dishes) acquired through the above series of acquisition operations. By acquiring more acquisition target objects 110 through the above series of acquisition operations, the attacking object having higher attacking power can be prepared.

When the attacking objects of the same color disposed on the slots are consecutively used, the attacking power is further increased (a bonus is given to the attacking power). For example, as the manual attack, the case of performing an attacking operation by using the three slots 108A to 108C within the own-side stock area 107 in order is assumed. In this case, if the attacking objects on the three slots all have the same color, a process of adding a bonus to the attacking power is also executed (for example, the attacking power is increased by 1.2 times). On the other hand, if the attacking objects on the slots 108A and 108C have the same color and only the attacking object on the slot 108B has a different color from that on the attacking objects on the slots 108A and 108C, the above bonus is not added to the attacking power. In such a case, it is possible to acquire an attacking power bonus by performing an attack consecutively using the attacking object on the slot 108A and the attacking object on the slot 108C (for example, slot 108A→slot 108C→slot 108B) in the manual attack.

The "ingredient", which is another element forming each acquisition target object 110, is used for calculation of a "score" that is an element different from the above "attacking power". As described above, even acquisition target objects having dishes of the same color may have different ingredients. The connection condition for consecutive acquisition only needs to be that dishes have the same color, and it does not matter whether the "ingredients" are the same or different. However, a bonus is added to the "score" by consecutively acquiring the same "ingredients" in the above series of acquisition operations. Accordingly, it is possible to enhance the entertainment characteristics of the game in terms of point-scoring.

(Details of Game Process)

Next, the game process according to the present embodiment will be described in detail with reference to FIGS. 20 to 32.

Figures 20, 21:
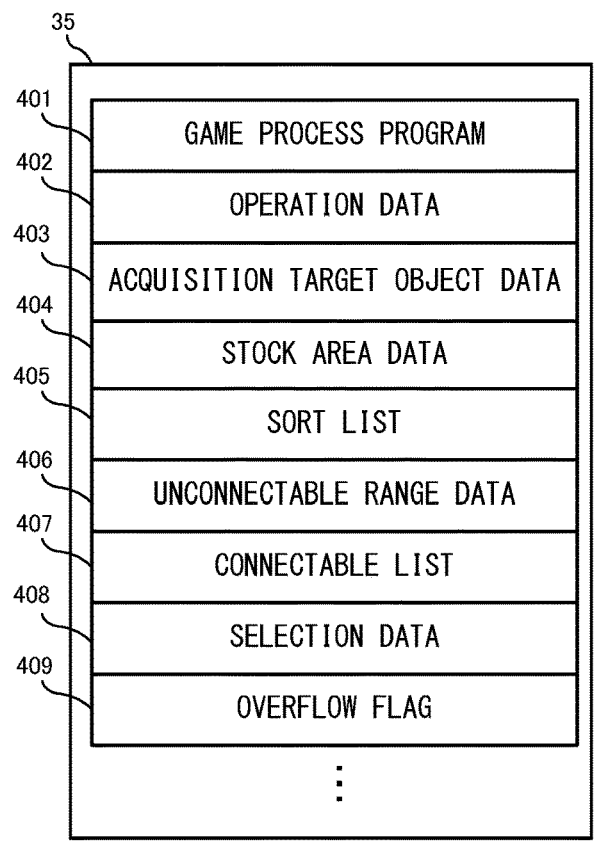
FIG. 20 is a diagram showing a non-limiting example of a program and information stored in a main memory 35.
FIG. 21 is a diagram showing a non-limiting example of the configuration of stock area data 404.

FIG. 20 shows an example of a program and information stored in the main memory 35 of the hand-held game apparatus 10. In the main memory 35, a game process program 401, operation data 402, acquisition target object data 403, stock area data 404, a sort list 405, unconnectable range data 406, a connectable list 407, selection data 408, an overflow flag 409, etc. are stored.

The game process program 401 is a program for executing the above-described game process. Specifically, the game process program 401 is a program for executing later-described flowchart processes in FIG. 22 and the like.

The operation data 402 is data indicating various operations performed on the hand-held game apparatus 10. In the present embodiment, the operation data 402 includes button data and touch panel data. These data are data indicating the contents of operations performed on the input device 31, and are data indicating pressed states of various buttons, a touch coordinate of the touch panel, touch duration, and the like.

The acquisition target object data 403 is data regarding the above-described acquisition target objects 110. The data indicating each acquisition target object includes attribute data regarding the above-described "dish" (the color of the dish, the attacking power, etc.) and attribute data regarding the "ingredient" (the type of the ingredient, the score, etc.).

The stock area data 404 is data for indicating the state of each slot of the own-side stock area 107. FIG. 21 shows an example of the configuration of the stock area data 404. The stock area data 404 is table-format data having items of a slot number 411, a state 412, a number of dishes 413, and a color 414. In FIG. 21, five records (corresponding to "rows" in a table shown in FIG. 21) associated with slot numbers 1 to 5 are shown as an example. The slot number 411 is a number for identifying the slots 108A to 108E in FIG. 3, the slot 108A (at the left end) in FIG. 3 corresponds to No. 1, and the slot 108E (at the right end) in FIG. 3 corresponds to No. 5. The state 412 indicates whether the slot is empty. The number of dishes 413 indicates the number of the "dishes" of the acquisition target objects provided on the slot. The color 414 indicates the color (attacking power) of the "dishes" of the acquisition target objects provided on the slot.

Referring back to FIG. 20, the sort list 405 and the unconnectable range data 406 are data to be temporarily used in a later-described connection enablement determination process. Although described in detail later, a determination process as to whether a connection is enabled is performed by using these data.

The connectable list 407 is data indicating other acquisition target objects that are connectable as described above, among the currently selected acquisition target objects 110.

The selection data 408 is data indicating the currently selected acquisition target object(s) in the above series of acquisition operations. That is, the selection data 408 is data indicating the acquisition target object for which the acquisition operations have not been completed (has not been put in the own-side stock area 107).

The overflow flag 409 is a flag to be used for determining whether to execute the above automatic attack process.

In addition to the above, various data (images, audio data, etc.) required for the game process is also stored in the main memory 35.

Next, flow of a game process executed by the processor section 33 of the hand-held game apparatus 10 will be described. In the game process, an acquisition-related process and an attack-related process are executed in parallel. The acquisition-related process is a process regarding an operation for acquiring the acquisition target objects as described above. The attack-related process is a process regarding an attack using the above-described attacking object stocked in the own-side stock area 107. For convenience of explanation, the acquisition-related process and the attack-related process are described as processes based on operations of the player. However, also as control of the opponent character 101, the same processes are basically performed except that the processor section 33 performs an acquisition operation and control of the manual attack (for example, the processes at the player side and the process of controlling the opponent character 101 are executed in parallel). The acquisition target objects 110 that can be acquired by the opponent character 101 are the acquisition target objects 110 moving on the opponent-side lane 102 and the common lane 106 as described above.

Figure 22:
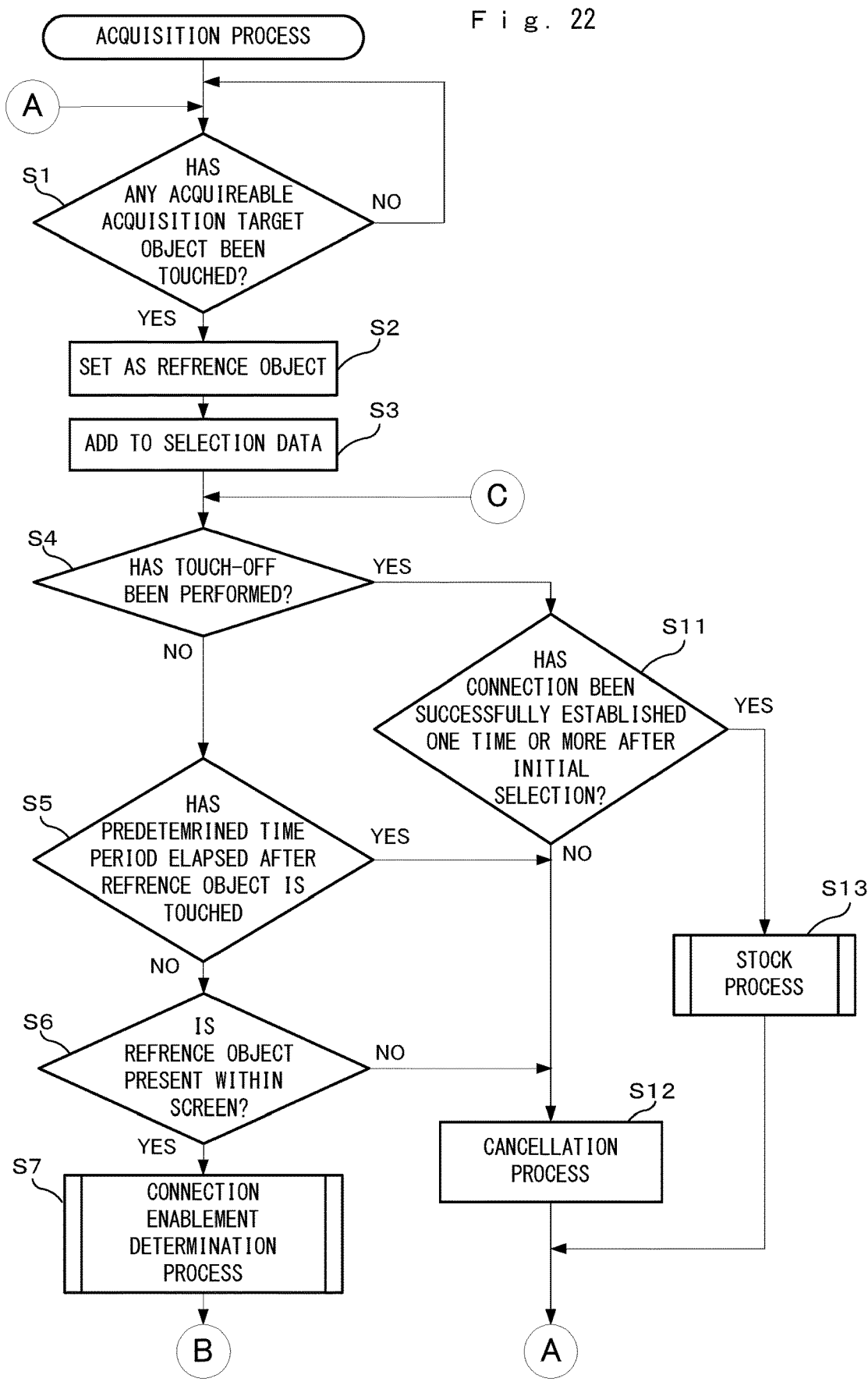
FIG. 22 is a flowchart showing the details of an acquisition-related process in the embodiment.
Figure 23:
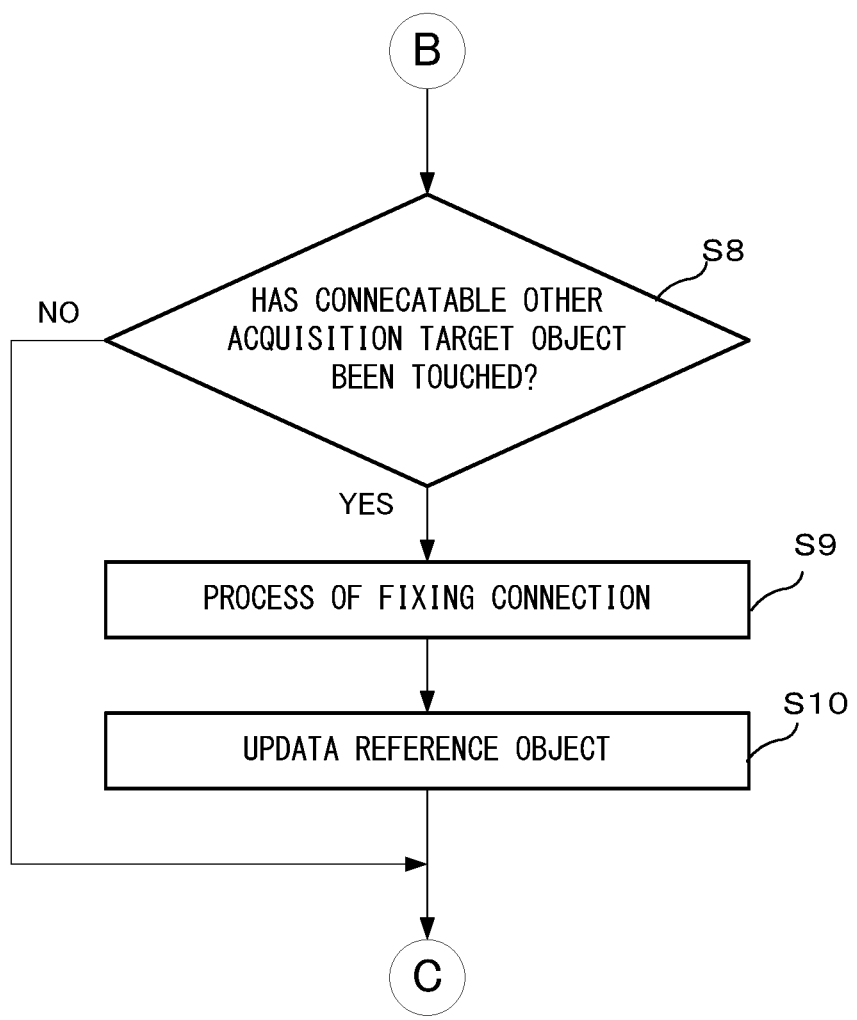
FIG. 23 is a flowchart showing the details of the acquisition-related process in the embodiment.

FIGS. 22 and 23 are flowcharts showing the details of the acquisition-related process. After the game starts, this process starts from a state where no input has been made to the touch panel.

First, in step S1, the processor section 33 shown in FIG. 2 determines whether a touch-on operation has been performed on any of the selectable acquisition target objects 110 through a touch operation. In the state where no input has been made to the touch panel, all the acquisition target objects 110 on the own-side lane 105 and the common lane 106 shown in FIG. 3 are basically selectable. In other words, this process is a process for determining whether an initial selection operation (touch-on) in a series of acquisition operations has been performed.

As a result of the above determination, when a touch-on has not been performed on any of the acquisition target objects 110 (NO in step S1), the process in step S1 is repeated. That is, the processor section 33 waits until a touch-on is performed on any of the acquisition target objects 110. On the other hand, when any of the acquisition target objects that are selectable through touching has been touched (YES in step S1), the processor section 33 sets the touched acquisition target object 110 as a "reference object" in step S2. Furthermore, the processor section 33 adds information indicating this acquisition target object 110 (the color of the dish, the type of the ingredient, etc.), to the selection data 408 in step S3. Thereafter, the processor section 33 proceeds to a process in step S4.

In step S4, the processor section 33 refers to the operation data 402 and determines whether a touch-off has been detected. As a result, when a touch-off has been detected (YES in step S4), the processor section 33 proceeds to a later-described process in step S11. When a touch-off has not been detected (NO in step S4), the processor section 33 determines, in step S5, whether the above second predetermined time period has elapsed from the time at which the reference object is touched. When the second predetermined time period has elapsed, the processor section 33 proceeds to a later-described process in step S12.

On the other hand, as a result of the determination in step S5, when the second predetermined time period has not elapsed (NO in step S5), the processor section 33 subsequently determines, in step S6, whether the reference object is present within the screen (of the lower LCD 12). That is, the processor section 33 determines whether the currently touched reference object has moved out of the screen or is remaining within the screen. As a result of the determination, when the reference object is not present within the screen (NO in step S6), the processor section 33 proceeds to a later-described process in step S12. On the other hand, when the reference object is present within the screen (YES in step S6), the processor section 33 executes the connection enablement determination process in step S7. This process is a process for determining whether the other objects are connectable from the reference object.

Hereinafter, the connection enablement determination process will be described in detail, but prior to this description, the principle and outline of this determination process will be described with reference to FIGS. 24 to 28. First, in this game, a circle having a radius r is provided, for each acquisition target object, as a range where collision of the acquisition target object is determined. The condition for another acquisition target object connectable from the reference object is that a straight line connecting the central points of the reference object and the other object is not obstructed by any other acquisition target object. In this case, "whether the straight line is obstructed" is determined as follows.

First, the acquireable objects other than the reference object are sorted in order of distance from the reference object. Next, in the sorted order, an angle degAn of a straight line connecting the central point of the reference object and the central point of another object and angles degBn and degCn of tangent lines from the central point of the reference object to the other object are calculated. Here, n is a numeric value starting with 1 in the sorted order. For example, for the first other object in the sorted order, such angles are indicated as angles degA1, degB1, and degC1. Whether the other object is connectable is determined on the basis of whether the angle degAn is included within a later-described "unconnectable range".

Figure 24:
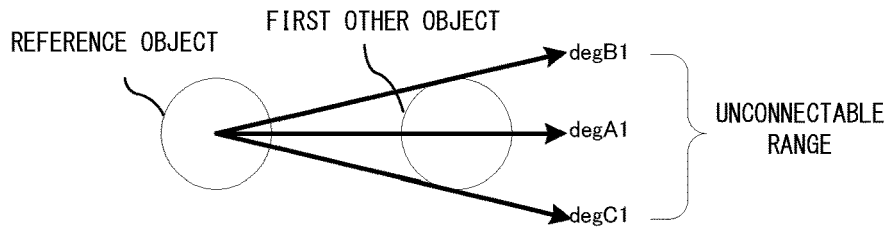
FIG. 24 is a diagram illustrating an outline of a connection enablement determination process.

Here, when this determination process is started, the reference object can be considered as being connectable at all angles from −180° to +180°. That is, the reference object is connectable to any of the other acquireable objects present around the reference object. Thus, in the process for the first acquireable object in the sorted order, a process of setting the "unconnectable range" serving as a reference in subsequent processes is performed. Then, determination as to whether a connection is enabled is performed on the second and subsequent acquireable objects by using the "unconnectable range". FIG. 24 is a diagram showing a relationship with the first acquireable object in the sorted order (the acquireable object closest to the reference object, hereinafter referred to as a first other object). In FIG. 24, first, the angle degA1 of the straight line connecting the central point of the reference object and the central point of the first other object is calculated. Furthermore, the angles degB1 and degC1 of the tangent lines from the central point of the reference object to the first other object are calculated. Then, since the first other object is connectable at all angles as described above, the first other object is added to the connectable list 407 as a "connectable" object, regardless of the angle degA1. Furthermore, the zone between the angles degB1 and degC1 is set as the "unconnectable range".

Thereafter, whether the other acquireable objects are further connectable from the reference object is determined in the sorted order. Hereinafter, the principle of the determination process will be described with the cases of four patterns shown in FIGS. 25 to 28 as the position of the second other acquireable object in the sorted order, as an example.

Figure 25:
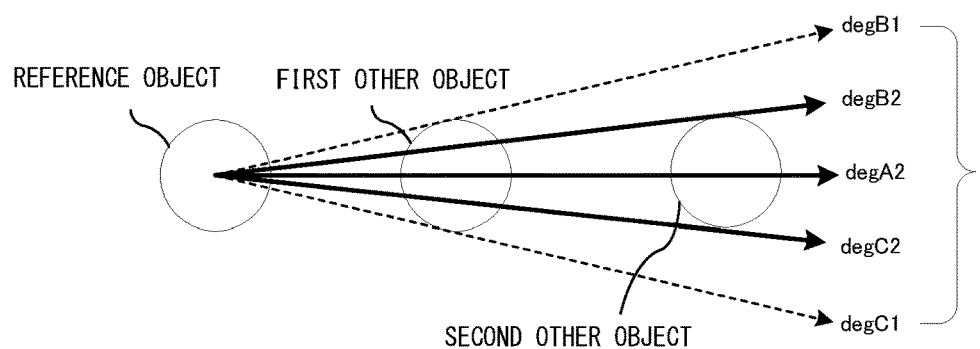
FIG. 25 is a diagram illustrating the outline of the connection enablement determination process.

FIG. 25 shows a state where a second other object that is the second in the sorted order is present at the right side of the first other object. That is, FIG. 25 shows the case where the second other object is set as a determination process target. In this case, an angle degA2 of the straight line connecting the central point of the reference object and the central point of the second other object is calculated. In addition, angles degB2 and degC2 of the tangent lines from the central point of the reference object to the second other object are calculated. Then, in the case of FIG. 25, the angle degA2 has a relationship in which the angle degA2 is included within the zone between the angles degB1 and degC1, which is the "unconnectable range". Thus, the second other object is determined as being "unconnectable". In addition, the zone between angles degB2 and degC2 is also included within the zone between the angles degB1 and degC1. In this case, the "unconnectable range" is not changed.

Figure 26:
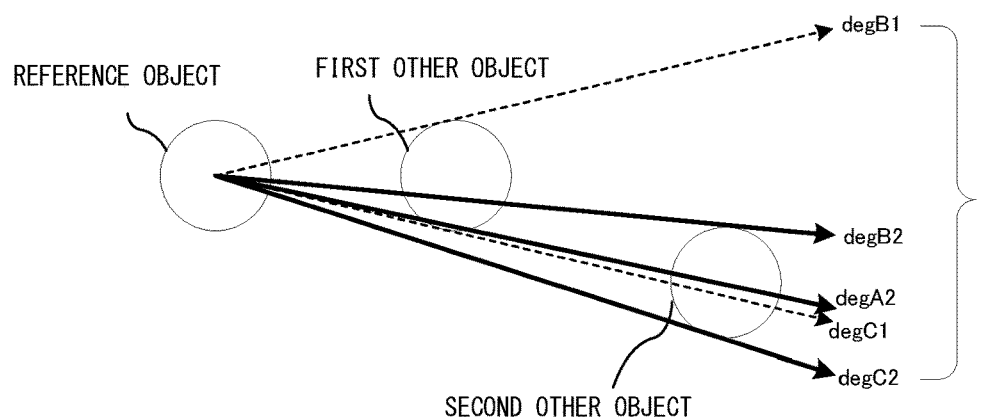
FIG. 26 is a diagram illustrating the outline of the connection enablement determination process.

Next, still another example will be described with reference to FIG. 26. FIG. 26 shows the case where the second other object is located at the obliquely right lower side of the first other object. In this case as well, similarly to the above, the angle degA2 of the straight line connecting the central points and the angles degB2 and degC2 of the tangent lines are calculated. Then, in the state of FIG. 26, the angle degA2 is included within the zone between the angles degB1 and degC1, which is the "unconnectable range". Therefore, the second other object in this case is also determined as being "unconnectable". In addition, in FIG. 26, the zone between the angles degB2 and degC2 of the tangent lines has a relationship in which the zone between the angles degB2 and degC2 partially overlaps the zone between the angles degB1 and degC1. In the case of the partial overlapping as described above, these two angles are combined, and the zone between the angles degB1 and degC2 is updated as the "unconnectable range". In subsequent processes, the updated "unconnectable range" is used.

Figure 27:
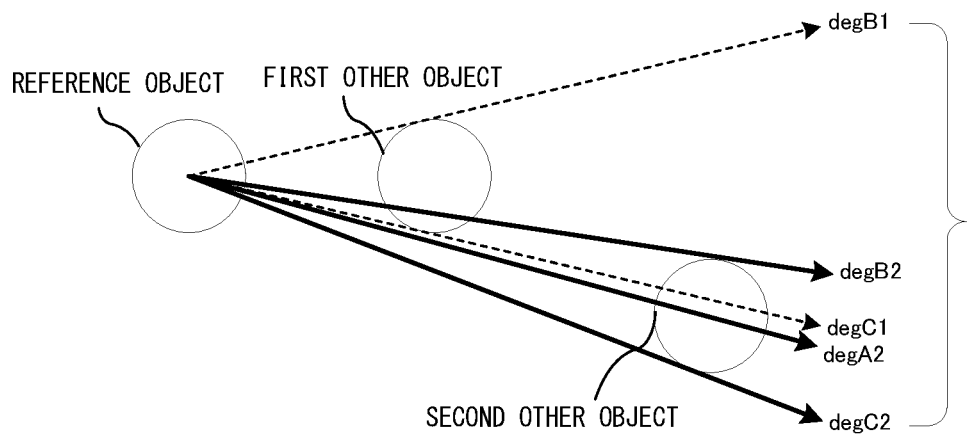
FIG. 27 is a diagram illustrating the outline of the connection enablement determination process.

Next, still another example will be described with reference to FIG. 27. FIG. 27 shows the case where the second other object is located lower than that in the case of FIG. 26. In this case, the angle degA2 of the straight line connecting the central points does not overlap (is not included within) the zone between the angles degB1 and degC1, which is the "unconnectable range". Therefore, the second other object in this case is determined as being "connectable" and is added to the connectable list 407. In addition, the zone between the angles degB2 and degC2 of the tangent lines in this case has a relationship in which the zone between the angles degB2 and degC2 partially overlaps the zone between the angles degB1 and degC1. Thus, similarly to the case of FIG. 26, these two angles are combined, and the zone between the angles degB1 and degC2 is updated as the "unconnectable range".

Figure 28:
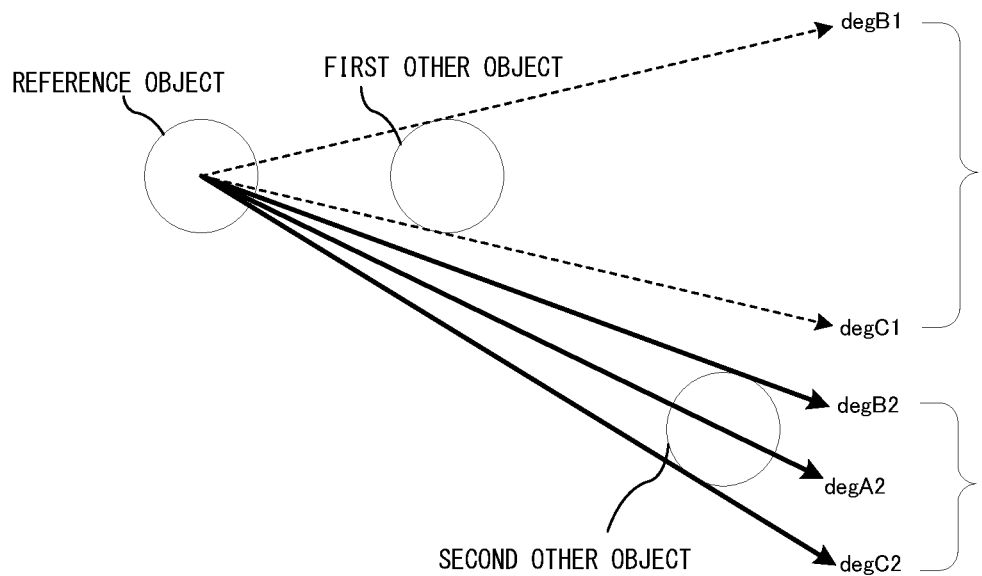
FIG. 28 is a diagram illustrating the outline of the connection enablement determination process.

Next, still another example will be described with reference to FIG. 28. FIG. 28 shows the case where the second other object is located lower than that in the case of FIG. 27. In this case, the angle degA2 of the straight line connecting the central point does not overlap the zone between the angles degB1 and degC1, which is the "unconnectable range". Therefore, the second other object in this case is determined as being "connectable" and is added to the connectable list 407. In addition, the zone between the angles degB2 and degC2 of the tangent lines in this case do not overlap the zone between the angles degB1 and degC1. In such a case, the "unconnectable range" is expanded to two zones, that is, the zone between the angles degB1 and degC1 and the zone between the angles degB2 and degC2. In subsequent processes, a connection at any of angles in these two zones is considered as being impossible.

The above-described determination process is performed on the other acquireable objects in the sorted order. Then, the acquireable object determined as being connectable is added to the connectable list 407.

Figure 29:
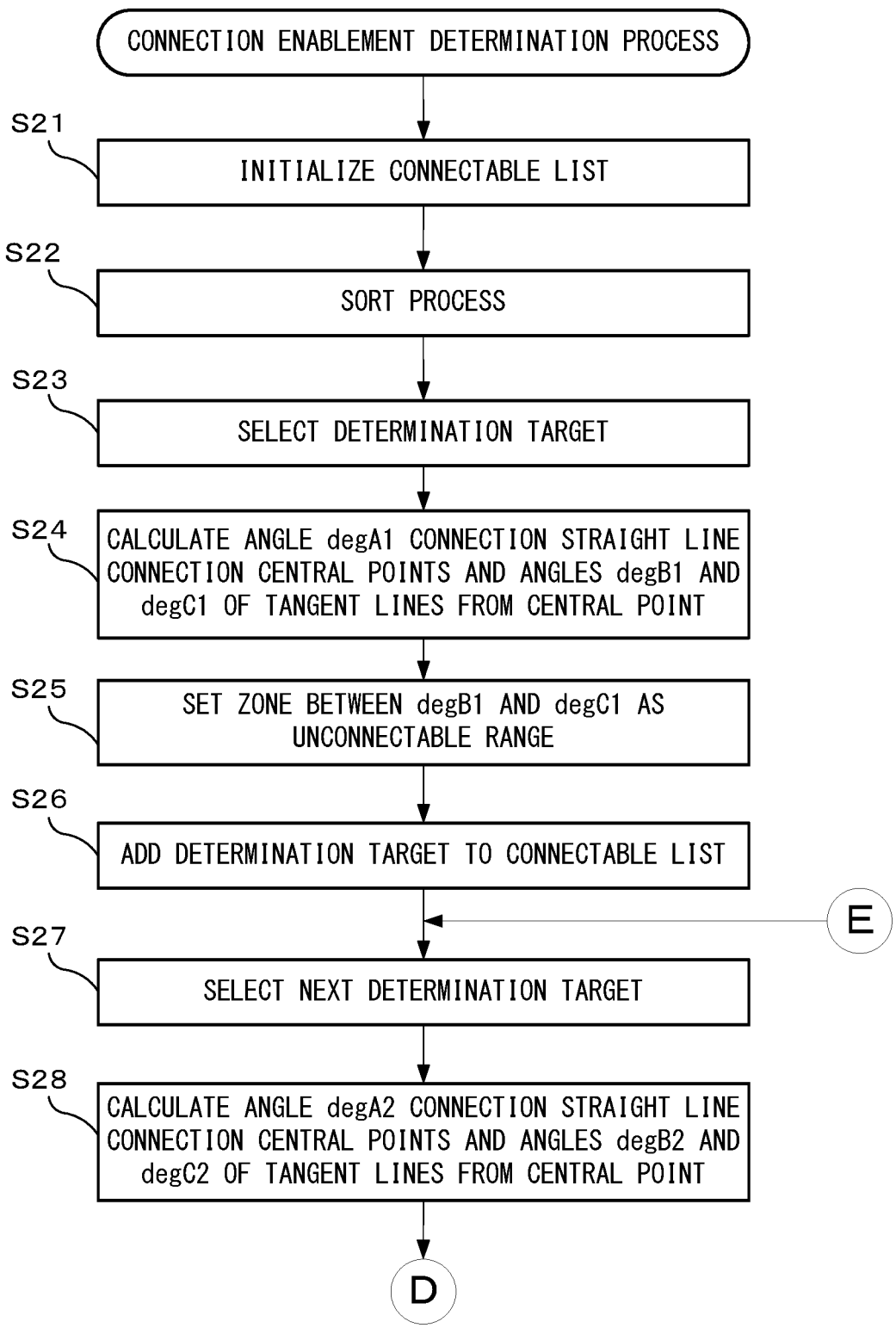
FIG. 29 is a flowchart showing the details of the connection enablement determination process.

Next, the connection enablement determination process will be described in detail with reference to FIGS. 29 and 30. In FIG. 29, first, in step S21, the processor section 33 initializes the connectable list 407. Next, in step S22, the processor section 33 sorts the acquireable objects other than the reference object in order of distance from the reference object, and creates the sort list 405 showing this order.

Next, in step S23, the processor section 33 refers to the sort list 405 and selects an acquisition target object as a determination target. At this time point, the first acquisition target object in the sorted order is selected. Hereinafter, the selected acquisition target object is referred to as a determination target object.

Next, in step S24, the processor section 33 calculates the angle degA1 of the straight line connecting the central point of the reference object and the central point of the determination target object as described above. Furthermore, the processor section 33 calculates the angles degB1 and degC1 of the tangent lines from the central point of the reference object to the determination target object as described above.

Next, in step S25, the processor section 33 stores the calculated angles degB1 and degC1 as the above-described unconnectable range in the unconnectable range data 406. Subsequently, in step S26, the processor section 33 adds information indicating the current determination target object, to the connectable list 407.

Next, in step S27, the processor section 33 refers to the sort list 405 and selects the next determination target object.

Next, in step S28, the processor section 33 calculates the angle degA2 of the straight line connecting the central points, for the determination target object. Furthermore, the processor section 33 calculates the angles degB2 and degC2 of the tangent lines.

Figure 30:
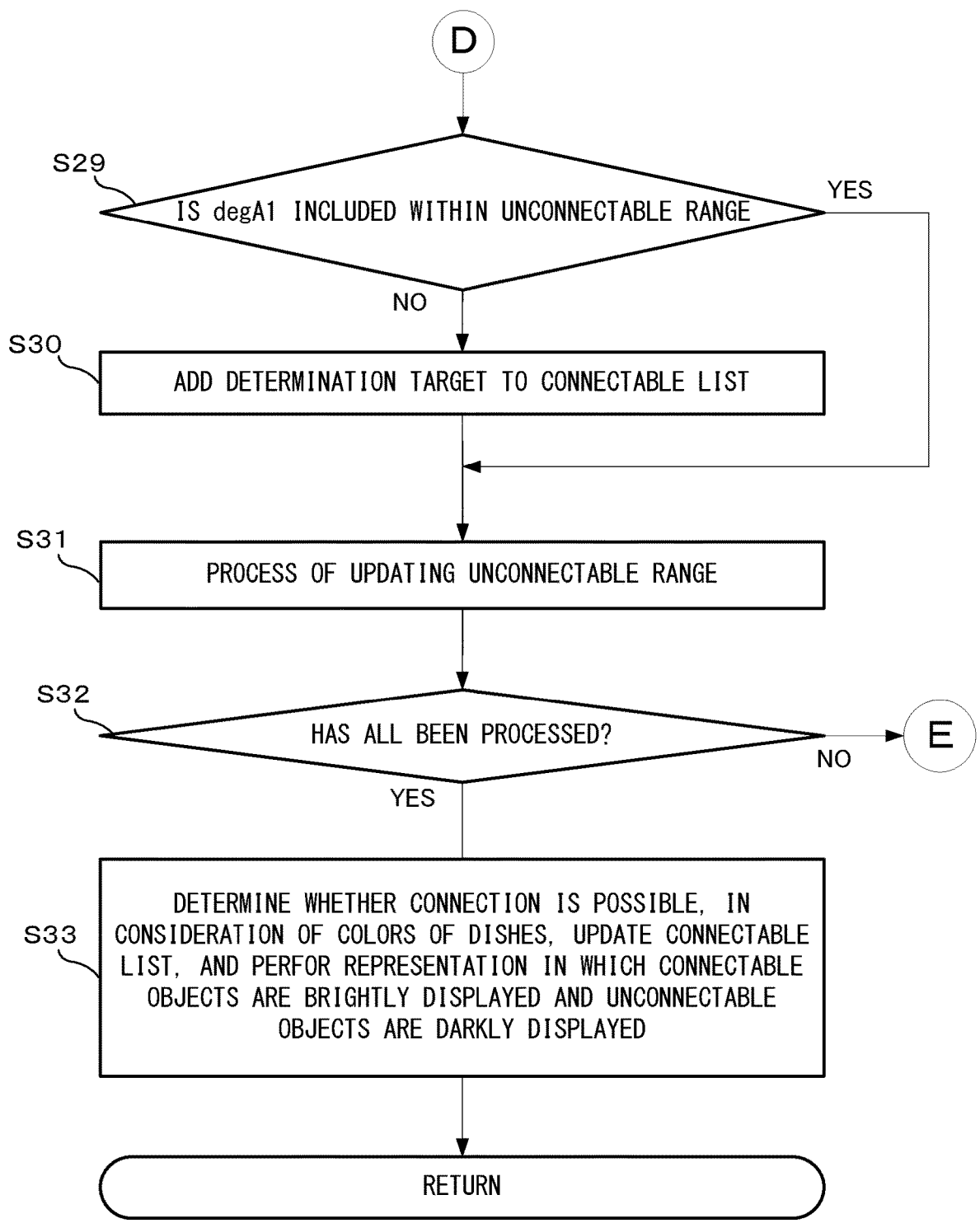
FIG. 30 is a flowchart showing the details of the connection enablement determination process.

Next, in step S29 in FIG. 30, the processor section 33 refers to the unconnectable range data 406 and determines whether the calculated angle degA2 is included within the unconnectable range. As a result of the determination, when the angle degA2 is not included within the unconnectable range (NO in step S29), the processor section 33 adds information indicating the current determination target object, to the connectable list 407 in step S30. Then, the processor section 33 proceeds to a process in step S31. On the other hand, when the angle degA2 is included within the unconnectable range (YES in step S29), the process in step S30 is not performed, and the processor section 33 proceeds to a process in step S31.

Next, in step S31, the processor section 33 determines a relationship between the current unconnectable range and the angles degB2 and degC2 of the tangent lines and executes an update process of updating the unconnectable range. Specifically, when the zone between the angles degB2 and degC2 partially overlaps the current unconnectable range, the processor section 33 updates the unconnectable range by combining the two angles as described above. In addition, as shown in FIG. 28, when the zone between the angles degB2 and degC2 is neither included within nor overlap the current unconnectable range, the unconnectable range is updated so as to have the angles of two zones.

Next, in step S32, the processor section 33 determines whether the above-described determination process has been performed on all the acquisition target objects in the sort list 405. When any unprocessed acquisition target object is remaining (NO in step S32), the processor section 33 returns to step S27 and repeats the process. When the determination process has been performed on all the acquisition target objects (YES in step S32), the processor section 33 executes, in step S33, a process of extracting the acquisition target objects 110 having the same dish color as that of the currently selected acquisition target object 110, from among the acquisition target objects listed in the connectable list 407. That is, the processor section 33 executes a process of extracting the acquisition target objects 110 that satisfy not only the above-described connectable condition regarding a positional relation but also a condition of "having the same dish color". Then, the connectable list 407 is updated so as to include only the extracted acquisition target objects 110. Furthermore, the processor section 33 executes a process for brightly displaying the connectable acquisition target objects and darkly displaying the unconnectable objects, as screen representation, on the basis of the updated connectable list 407. This is the end of the connection enablement determination process.

Referring back to FIG. 22, subsequently to the connection enablement determination process, in step S8 in FIG. 23, the processor section 33 determines whether any of the connectable other acquisition target objects has been touched, by using the connectable list 407. An operation of sliding the stylus as described above is assumed as an operation, and thus the processor section 33 determines whether a current touch coordinate indicates the position of any of the connectable other acquisition target objects. As a result of the determination, when any of the connectable other acquisition target objects has been touched (YES in step S8), the processor section 33 executes a process of fixing a connection, in step S9. Specifically, the processor section 33 adds information indicating the currently touched acquisition target object 110, to the selection data 408. In addition, the processor section 33 executes screen representation in which the previously touched acquisition target object 110 moves to the position of the currently touched acquisition target object 110. Moreover, the processor section 33 executes a process of displaying a numeric value indicating the number of the currently selected acquisition target objects 110, such that the numeric value is superimposed on the currently touched acquisition target object 110.

Next, in step S10, the processor section 33 updates the currently touched acquisition target object 110 as a new reference object. Thereafter, the processor section 33 returns to step S4.

On the other hand, as a result of the determination in step S8, when any of the connectable other acquisition target objects has not been touched (NO in step S8), the processes in steps S9 and S10 are not performed, and the processor section 33 returns to step S4.

Next, a process performed when a touch-off has been performed as a result of the determination in step S4 in FIG. 22 will be described. In this case, in step S11, the processor section 33 determines whether a connection has been successfully established one time or more after the initial selection. As a result of the determination, when a connection has not been successfully established one time or more (NO in step S11), the processor section 33 performs a cancellation process in step S12. This process is a process of cancelling the acquisition operation at this time. The processor section 33 clears the selection data 408. At this time, the processor section 33 may display an effect in which a connection is cut, as screen representation, at the position of the currently selected acquisition target object. When there is no currently selected object (for example, a state where the screen is not touched has continued) at the time of this process, any particular process is not performed. Thereafter, the processor section 33 returns to step S1 and repeats the process.

On the other hand, as a result of the determination in step S11, when a connection has been successfully established one time or more (YES in step S11), a stock process is executed in step S13. This process is a process for fixing "acquisition of the acquisition target objects 110 selected at the time of the touch-off and disposing the acquisition target objects 110 (as an attacking object) in the above stock area.

Figure 31:
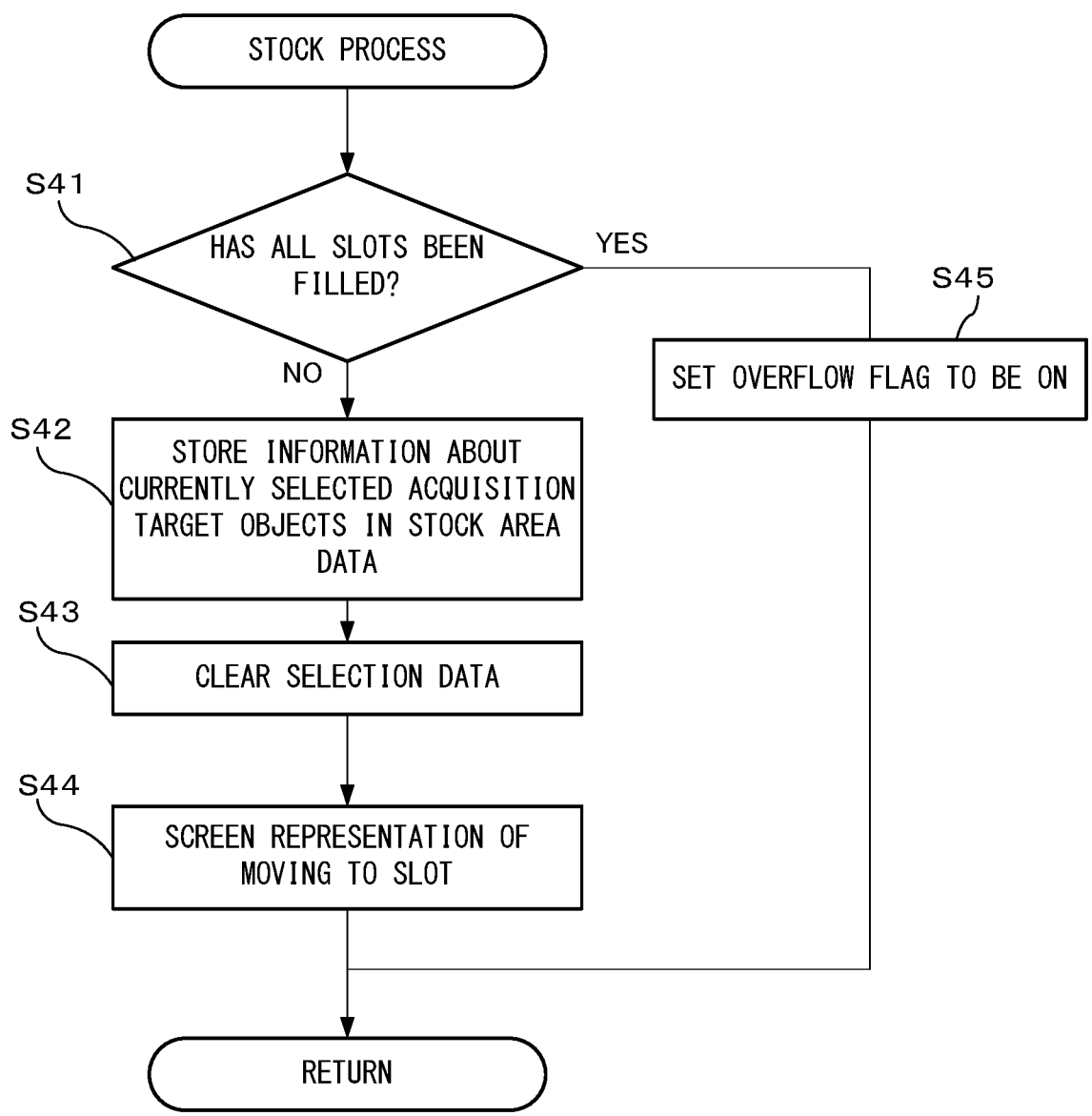
FIG. 31 is a flowchart showing the details of a stock process.

FIG. 31 is a flowchart showing the details of the stock process. In FIG. 31, first, in step S41, the processor section 33 refers to the stock area data 404 and determines whether all the five slots in the own-side stock area 107 have been filled. As a result of the determination, when not all the five slots have been filled and at least one or more empty slots are present (NO in step S41), the processor section 33 stores the acquisition target object currently selected at the time of the touch-off, that is, information about the acquisition target objects 110 indicated by the selection data 408, in the record of the empty slot in the stock area data 404 in step S42. At this time, the information about the acquisition target objects 110 to be newly stored is stored in the record of the No. 1 slot at every time. Thus, when the No. 1 slot has already been filled, a process of shifting data in each of the records of the subsequent slots toward the No. 5 slot by one slot to make the record of the No. 1 slot empty is also performed. In another embodiment, storing the information is not limited to storing the information in the record of the No. 1 slot at every time, and the information may be stored as appropriate in an empty slot record without shifting data.

In the process in step S42, addition of a score is performed on the basis of the information about the acquisition target objects 110 indicated by the selection data 408. Score calculation is performed on the basis of the types of the above-described "ingredient" parts.

Next, in step S43, the processor section 33 clears the selection data 408. Subsequently, in step S44, the processor section 33 performs screen representation in which the acquisition target objects 110 selected when the touch-off is performed are moved to the own-side stock area 107. In this game, as described above, screen representation is performed in which the acquisition target objects 110 move to the position of the player character (at this time, the player character makes a motion of eating the ingredients) and then move to the position of the slot in the stock area.

On the other hand, as a result of the determination in step S41, when all the slots have been filled (YES in step S41), the processor section 33 sets the overflow flag 409 to be ON in step S45. An automatic attack process is executed in the later-described attack-related process in accordance with the overflow flag being set to be ON. This is the end of the stock process.

Referring back to FIG. 22, after the stock process ends, the processor section 33 returns to step S1 and repeats the process. This is the end of the detailed description of the acquisition-related process.

Figure 32:
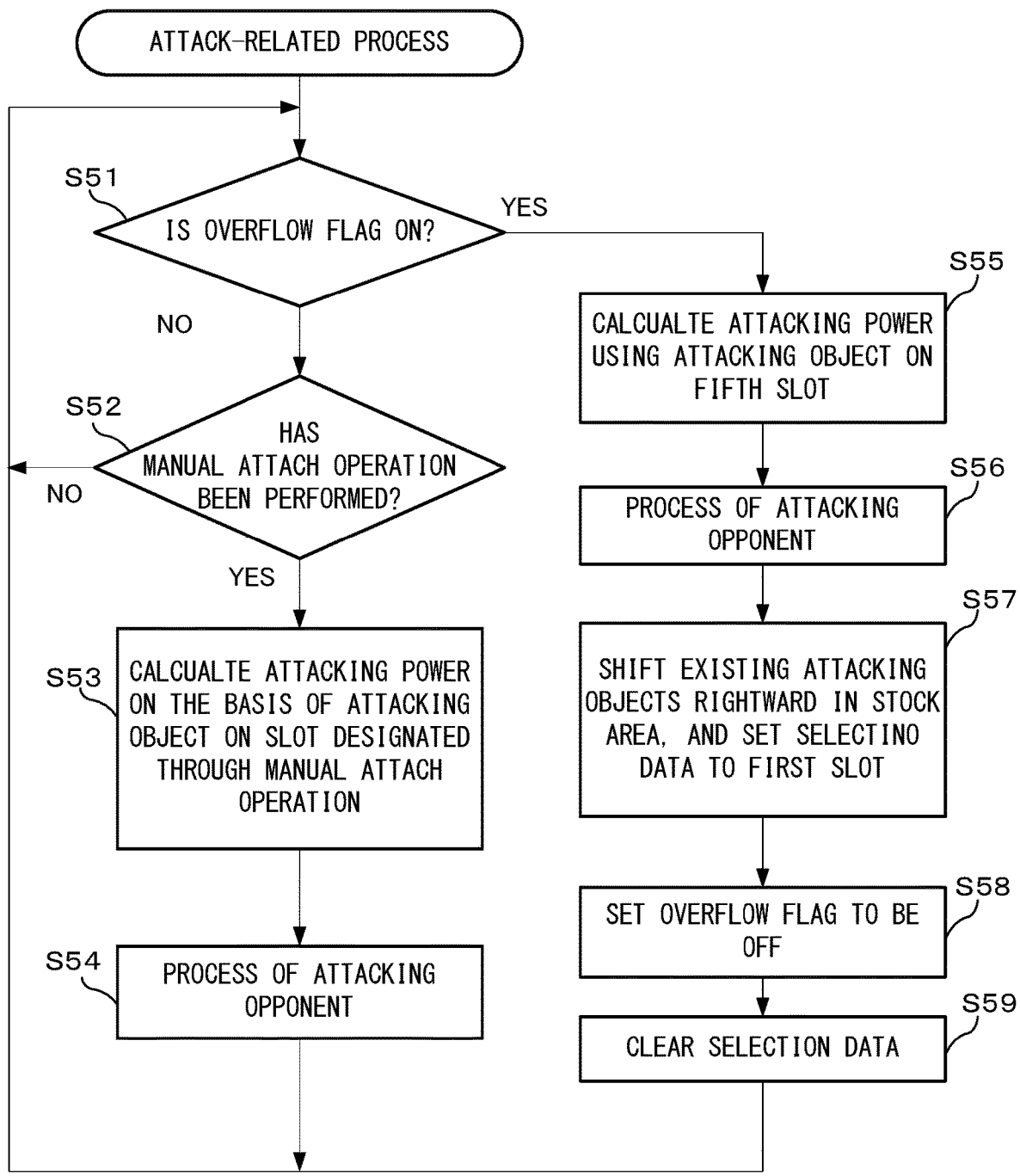
FIG. 32 is a flowchart showing the details of an attack-related process.

Next, the attack-related process executed in parallel with the acquisition-related process will be described in detail. FIG. 32 is a flowchart showing the details of the attack-related process. In FIG. 32, first, in step S51, the processor section 33 determines whether the overflow flag 409 has been set to be ON. As a result of the determination, when the overflow flag 409 is not ON (NO in step S51), the processor section 33 refers to the operation data 402 and determines whether a manual attack operation as described above (for example, a flick operation on any attacking object in the upward direction in the screen) has been performed, in step S52. As a result of the determination, when a manual attack operation has been performed (YES in step S52), the processor section 33 performs a calculation process of calculating attacking power on the basis of the attacking object on which the manual attack operation has been performed, in step S53. For example, the processor section 33 calculates attacking power by multiplying basic attacking power corresponding to the dish color of the attacking object by a predetermined multiplying factor based on the number of the dishes. In addition, when attacks are consecutively made with the attacking objects having the same color, a process of increasing the attacking power in accordance with the number of the consecutive attacks is also executed.

Next, in step S54, the processor section 33 executes an attack process of attacking the opponent on the basis of the calculated attacking power. That is, the processor section 33 performs a process of adding a damage value corresponding to the attacking power, to the opponent character 101, or displays various types of screen representation regarding an attack, such as the attacking object flying toward the opponent character 101. Thereafter, the processor section 33 returns to step S51 and repeats the process.

On the other hand, as a result of the determination in step S51, when the overflow flag 409 has been set to be ON (YES in step S51), an automatic attack process is executed, since all the slots of the own-side stock area 107 have been filled. Specifically, in step S55, the processor section 33 calculates attacking power on the basis of the attacking object on the fifth slot (the slot 108E at the right end in FIG. 3) similarly to step S53. Next, in step S56, the processor section 33 performs an attack process of attacking the opponent using the calculated attacking power similarly to step S54.

Next, in step S57, the processor section 33 executes a process of shifting each of the attacking objects associated with the records of the first to fourth slots in the stock area data 404, toward the record of the fifth slot by one slot. Accordingly, the record of the first slot becomes empty, and thus the processor section 33 stores information about the acquisition target objects 110 indicated by the selection data 408, in the empty record of the first slot.

Next, in step S58, the processor section 33 sets the overflow flag 409 to be OFF. Subsequently, in step S59, the processor section 33 clears the selection data 408. Then, the processor section 33 returns to step S51 and repeats the process. This is the end of the detailed description of the attack-related process.

As described above, in the game process of the present embodiment, the player acquires a plurality of acquisition target objects moving on the lanes, by touching the acquisition target objects so as to link the acquisition target objects, and stocks the acquisition target objects in the own-side stock area 107. Then, the player attacks the opponent by using the stocked acquisition target objects 110. In addition, the opponent controlled by the processor section 33 also executes the same acquisition process as described above, and executes an attack process against the player. As described above, the player and the opponent quickly acquire the continuously moving acquisition target objects 110 and attack each other, and thus a versus type puzzle game having high action characteristics can be provided. In addition, the acquisition target objects 110 on the common lane 106 provide a factor of scrambling for the acquisition target objects 110 together with the opponent, which further enhances the strategic characteristics and the entertainment characteristics of the game. Moreover, the acquisition target objects 110 each have the two attributes of "ingredient" and "dish" as described above, and only one attribute (dish) of the two attributes is used for determination as to success or failure of an acquisition operation. The other attribute (ingredient) is used for calculating a "score" which is unrelated to success or failure of acquisition. Accordingly, the configurations of the acquisition target objects can be diversified and varied, and thus the entertainment characteristics of the game can be enhanced.

(Modifications)

In the above embodiment, the own-side lane 105, the opponent-side lane 102, and the common lane 106 are displayed, and the acquisition target objects 110 are moving on each lane (referred to as path). There is no limitation on such a mode, and, in another embodiment, for example, the lanes may not be displayed. For example, in this embodiment, the acquisition target objects 110 are moving in the air. That is, the "path" on which the acquisition target objects 110 are moving may be visible or invisible.

The movement direction of each acquisition target object 110 is not limited to the horizontal direction in the screen as described above. In another embodiment, as the movement direction, the acquisition target objects 110 may be moved along an axis extending in the vertical direction in the screen. In the above embodiment, the case where a plurality of lanes (paths) that end at the edge of the screen are used is taken as an example. In addition to the above, for example, a continuous lane (path) that curves in a U shape at the edge of the screen may be used. That is, one path that meanders may be used. Moreover, a continuous path that curves at arbitrary positions and does not meander may be used.

In the above embodiment, the acquired acquisition target objects 110 are finally eliminated from the lanes. The display manner of the acquired acquisition target objects 110 is not limited to such "elimination", and may be changed to another display manner. For example, the acquired acquisition target objects 110 may be displayed in a blinking manner or may be grayed out.

Regarding the acquisition operation, in the above embodiment, the player can acquire not only the objects on different lanes but also the objects on the same lane as long as the objects are located on the own-side lane 105 and the common lane 106. Regarding this feature, for example, as the connectable condition, an essential condition of the acquisition target objects being on different lanes may be set. In addition, an essential condition of acquiring the objects on different lanes at least once in a series of acquisition operations may be set.

In the above embodiment, three types of lanes, that is, the own-side lane 105, the opponent-side lane 102, and the common lane 106 are set, and the lanes on which the acquireable objects can be acquired by the player are partially different from the lanes on which the acquireable objects can be acquired by the opponent. There is no limitation thereon, and in another embodiment, the lanes may not be classified into own-side lanes and opponent-side lanes, and acquireable objects on all the lanes may be acquireable by both the player and the opponent (that is, each lane may be configured as the common lane).

In the above embodiment, the puzzle game is taken as an example. The embodiment is not limited to the puzzle game, and the above processes are applicable to general versus-type action games in which a player and an opponent acquire objects within a screen and attack each other by using the acquired objects.

In the above embodiment, the hand-held game apparatus including the two display devices is taken as an example. In another embodiment, a hand-held terminal or tablet type terminal including a single display device and a touch panel provided on the screen of the display device may be used. In the above embodiment, the touch panel is taken as an example of a device that detects a position, on an operation area, designated by the player. However, the device may be a so-called pointing device with which the player is allowed to designate a position within a predetermined area, and may be, for example, a mouse that allows any position on a screen to be designated, a tablet that does not include a display screen and that allows any position on an operation surface to be designated, or a pointing device that includes an imaging means for remotely capturing an image of a display screen and a marker or the like located around the display screen and that calculates a coordinate on the display screen corresponding to a pointed position on the display screen, from the positions of the display screen and the marker in an image captured by pointing toward a direction to the display screen with the device. In addition, regarding the above selection operation, a button operation using various buttons may be performed instead of an operation using the pointing device.

What is claimed is:

1. A non-transitory computer-readable storage medium having stored therein a game program executed by a computer of an information processing apparatus, the game program causing the computer to provide execution comprising:
    displaying objects moving on a plurality of paths within a virtual space along movement directions that are set for the paths, respectively;
    determining whether a plurality of the objects that satisfy a predetermined condition have been designated, when an operation input has been performed on the objects as the objects move on the plurality of paths within the virtual space, and causing the plurality of the designated objects to enter a state of being selected, when it is determined that the plurality of the objects that satisfy the predetermined condition has been designated; and
    performing, at predetermined timing, control in which a display manner of selected objects that are the objects in the state of being selected is changed, wherein
    a first attribute and a second attribute are set for each of the objects,
    when a condition that the first attributes of the plurality of the designated objects are the same is satisfied, the predetermined condition is determined as being satisfied, and
    additional control, in which the objects are eliminated from the paths on the basis of a program process that is based on an operation input of an opponent or not based on an operation input, is performed.

2. The non-transitory computer-readable storage medium according to claim 1, wherein, when a condition that a plurality of the objects are present on the paths different from each other is satisfied, the predetermined condition is determined as being satisfied.

3. The non-transitory computer-readable storage medium according to claim 1, wherein, when a condition that a plurality of the objects are present on the same path is satisfied, the predetermined condition is determined as being satisfied.

4. The non-transitory computer-readable storage medium according to claim 1, wherein
    the plurality of paths are parallel to each other, and
    the movement directions that are set for the plurality of paths, respectively, include at least directions, at adjacent paths, which are opposite to each other.

5. The non-transitory computer-readable storage medium according to claim 1, wherein, when an operation input of consecutively designating a plurality of the objects one by one has been performed, if a condition that any other object is not present on a line connecting the last selected object and the currently selected object is satisfied, the predetermined condition is determined as being satisfied.

6. The non-transitory computer-readable storage medium according to claim 1, wherein the second attribute is used for a process of point addition to a score within a game.

7. The non-transitory computer-readable storage medium according to claim 1, wherein, when a state where the same object is designated or selected has continued for a predetermined time period or longer, moving speeds of the objects moving along the paths are changed.

8. The non-transitory computer-readable storage medium according to claim 1, wherein the additional control is performed only on the objects on a part of the plurality of paths.

9. The non-transitory computer-readable storage medium according to claim 1, wherein, a process of displaying an object on a path different from the paths within the virtual space such that the object is eliminated on the basis of a program process that is based on an operation input of an opponent or not based on an operation input, is further performed.

10. The non-transitory computer-readable storage medium according to claim 1, wherein a moving speed of one or more selected objects increases during a period of time in which the operation input is being performed.

11. A game apparatus, comprising:
    a processor; and
    a memory, configured to store computer readable instructions that, when executed by the processor, cause the game apparatus to:
        display objects moving on a plurality of paths within a virtual space along movement directions that are set for the paths, respectively;
        determine whether a plurality of the objects that satisfy a predetermined condition have been designated, when an operation input has been performed on the objects as the object move on the plurality of paths within the virtual space, and to cause the plurality of the designated objects to enter a state of being selected, when it is determined that the plurality of the objects that satisfy the predetermined condition has been designated; and
        perform, at predetermined timing, control in which a display manner of selected objects that are the objects in the state of being selected is changed, wherein
    a first attribute and a second attribute are set for each of the objects,
    when a condition that the first attributes of the plurality of the designated objects are the same is satisfied, the predetermined condition is determined as being satisfied, and
    additional control, in which the objects are eliminated from the paths on the basis of a program process that is based on an operation input of an opponent or not based on an operation input, is performed.

12. A game process control method executed by a computer controlling an information processing apparatus, the game process control method comprising:
    displaying objects moving on a plurality of paths within a virtual space along movement directions that are set for the paths, respectively;
    determining whether a plurality of the objects that satisfy a predetermined condition have been designated, when an operation input has been performed on the objects as the objects move on the plurality of paths within the virtual space, and causing the plurality of the designated objects to enter a state of being selected, when it is determined that the plurality of the objects that satisfy the predetermined condition has been designated; and performing, at predetermined timing, control in which a display manner of selected objects that are the objects in the state of being selected is changed, wherein a first attribute and a second attribute are set for each of the objects, when a condition that the first attributes of the plurality of the designated objects are the same is satisfied, the predetermined condition is determined as being satisfied, and additional control, in which the objects are eliminated from the paths on the basis of a program process that is based on an operation input of an opponent or not based on an operation input, is performed.

* * * * *